United States Patent
Nishimura et al.

(10) Patent No.: US 9,753,199 B2
(45) Date of Patent: Sep. 5, 2017

(54) VARIABLE WAVELENGTH INTERFERENCE FILTER, OPTICAL FILTER DEVICE, OPTICAL MODULE, AND ELECTRONIC APPARATUS

(71) Applicant: Seiko Epson Corporation, Tokyo (JP)

(72) Inventors: Teruyuki Nishimura, Matsumoto (JP); Akira Sano, Shiojiri (JP)

(73) Assignee: Seiko Epson Corporation (JP)

(*) Notice: Subject to any disclaimer, the term of this patent is extended or adjusted under 35 U.S.C. 154(b) by 188 days.

(21) Appl. No.: 13/859,825

(22) Filed: Apr. 10, 2013

(65) Prior Publication Data

US 2013/0271839 A1 Oct. 17, 2013

(30) Foreign Application Priority Data

Apr. 11, 2012 (JP) ................................. 2012-089970

(51) Int. Cl.
| | |
|---|---|
| *G02B 27/00* | (2006.01) |
| *G02B 5/28* | (2006.01) |
| *G02B 26/00* | (2006.01) |
| *G01J 3/26* | (2006.01) |
| *G01J 3/51* | (2006.01) |

(52) U.S. Cl.
CPC .................. *G02B 5/28* (2013.01); *G01J 3/26* (2013.01); *G01J 3/51* (2013.01); *G02B 26/001* (2013.01)

(58) Field of Classification Search
CPC .. G01J 3/26; G01J 3/51; G02B 26/001; G02B 5/28; G02B 27/00
USPC ................................................ 359/578, 584
See application file for complete search history.

(56) References Cited

U.S. PATENT DOCUMENTS

| | | | |
|---|---|---|---|
| 6,590,710 | B2 | 7/2003 | Hara et al. |
| 7,130,103 | B2 | 10/2006 | Murata |
| 7,646,134 | B2 | 1/2010 | Ogikubo et al. |
| 7,738,159 | B2 | 6/2010 | Nishio |
| 2005/0030438 | A1 | 2/2005 | Nishioka |

(Continued)

FOREIGN PATENT DOCUMENTS

| | | |
|---|---|---|
| EP | 2367044 A1 | 9/2011 |
| JP | 2001-221913 | 8/2001 |

(Continued)

OTHER PUBLICATIONS

European Office Action and Search Report for Application No. 13162882.8 dated Aug. 7, 2013.

*Primary Examiner* — Scott J Sugarman
*Assistant Examiner* — Balram Parbadia
(74) *Attorney, Agent, or Firm* — Harness, Dickey & Pierce, P.L.C.

(57) ABSTRACT

A variable wavelength interference filter includes a stationary substrate including a stationary reflecting film and a stationary electrode, and a movable substrate including a movable reflecting film and a movable electrode, the stationary electrode and the movable electrode are disposed outside an optical interference region where the stationary reflecting film and the movable reflecting film overlap each other in a filter plan view, an inner peripheral edge of the stationary electrode is located nearer to the optical interference region than an outer peripheral edge of the movable electrode, and an outer peripheral edge of the stationary electrode is located further from the optical interference region than an outer peripheral edge of the movable electrode.

17 Claims, 16 Drawing Sheets

(56) References Cited

U.S. PATENT DOCUMENTS

| | | | |
|---|---|---|---|
| 2009/0306479 A1 | 12/2009 | Kamihara | |
| 2011/0222157 A1 | 9/2011 | Sano | |
| 2011/0222158 A1* | 9/2011 | Sano | 359/584 |
| 2011/0255166 A1 | 10/2011 | Shinto et al. | |
| 2012/0050742 A1* | 3/2012 | Sano | G01J 3/26 356/416 |
| 2012/0154915 A1* | 6/2012 | Hirokubo | G01J 3/26 359/578 |
| 2012/0200926 A1 | 8/2012 | Matsushita | |

FOREIGN PATENT DOCUMENTS

| | | |
|---|---|---|
| JP | 2002-174721 | 6/2002 |
| JP | 2003-057438 | 2/2003 |
| JP | 2004-348047 | 12/2004 |
| JP | 2005-092175 | 4/2005 |
| JP | 2005-250376 | 9/2005 |
| JP | 2007-015067 | 1/2007 |
| JP | 2009-195053 | 8/2009 |
| JP | 2009-205004 | 9/2009 |
| JP | 2011-191492 | 9/2011 |
| JP | 2011-227224 | 11/2011 |
| JP | 2012-163664 | 8/2012 |

\* cited by examiner

VARIABLE WAVELENGTH INTERFERENCE FILTER, OPTICAL FILTER DEVICE, OPTICAL MODULE, AND ELECTRONIC APPARATUS

BACKGROUND

1. Technical Field

The present invention relates to a variable wavelength interference filter, an optical filter device, an optical module, and an electronic apparatus.

2. Related Art

A known variable wavelength interference filter uses two opposed reflecting films to selectively emit light with a predetermined target wavelength by varying the size of the gap between the two reflecting films to thereby vary the wavelength of the light to be transmitted (see, e.g., JP-A-2001-221913).

The variable wavelength interference filter (the Fabry-Perot filter) described in JP-A-2001-221913 is provided with a substrate, a first reflecting film (a first mirror) disposed on the substrate, and a second reflecting film (a second mirror) disposed so as to be opposed to the first reflecting film with a predetermined gap (an inter-reflecting film gap) intervening therebetween. Further, a first electrode is disposed on the first reflecting film so that it is bilaterally symmetric with respect to a region for transmitting the light, and a second electrode is disposed on a surface of the second reflecting film which is opposed to the substrate so that the second electrode is bilaterally symmetric with respect to the region for transmitting the light and is opposed to the first electrode.

In such a variable wavelength interference filter, an electrostatic actuator is constituted by the first electrode and the second electrode with the regions opposed to each other. By applying a voltage between the electrodes, it becomes possible to vary the inter-reflecting film gap due to the electrostatic attractive force.

Incidentally, although the first electrode and the second electrode are disposed so as to be opposed to each other in the variable wavelength interference filter described in JP-A-2001-221913, the positions of the upper and lower electrodes might be shifted from each other due to a bonding misalignment of the substrate in the manufacturing process. In such cases, since the area functioning as the electrostatic actuator shrinks, there is a problem that the characteristics of the electrostatic actuator fail to be maintained, and the accuracy of gap control of the inter-reflecting film gap degrades.

SUMMARY

An advantage of the invention is to provide a variable wavelength interference filter, an optical filter device, an optical module, and an electronic apparatus that are capable of maintaining the accuracy of the gap control of the inter-reflecting film gap even if bonding misalignment of the substrate occurs in the manufacturing process.

A variable wavelength interference filter according to an aspect of the invention includes a first substrate, a second substrate opposed to the first substrate, a first reflecting film provided to the first substrate, a second reflecting film provided to the second substrate, and opposed to the first reflecting film across an inter-reflecting film gap, a first electrode provided to the first substrate, and a second electrode provided to the second substrate, and opposed to the first electrode, the first electrode and the second electrode are disposed outside an optical interference region where the first reflecting film and the second reflecting film overlap each other in a plan view of the first substrate and the second substrate viewed from a substrate thickness direction, a first peripheral edge of the first electrode being located near the optical interference region and being located nearer to the optical interference region than peripheral edges of the second electrode in the plan view, and a second peripheral edge of the first electrode being located on an opposite side to the optical interference region and being located further from the optical interference region than the peripheral edges of the second electrode in the plan view.

In this aspect of the invention, the first electrode provided to the first substrate and the second electrode provided to the second substrate are arranged so as to be opposed to each other. Therefore, the region where the first electrode and the second electrode are opposed to each other constitutes the electrostatic actuator, and by applying a voltage between the electrodes, the electrostatic attractive force is generated, and it becomes possible to vary the inter-reflecting film gap.

Here, in this aspect of the invention, the first peripheral edge of the first electrode is located on the side nearer to the optical interference region than the peripheral edge of the second electrode, the peripheral edge being near the optical interference region in the plan view. Further, a second peripheral edge of the first electrode being located on an opposite side to the optical interference region, and being located further from the optical interference region than the peripheral edge of the second electrode, the peripheral edge being located on an opposite side to the optical interference region. For example, in the case in which the first electrode and the second electrode are disposed along the ring-like imaginary line disposed outside the optical interference region in the plan view, the width dimension of the first electrode is larger than the width dimension of the second electrode, and the second electrode is disposed inside the first electrode in the plan view.

In such a configuration, even if a slight bonding misalignment occurs when bonding the first substrate and the second substrate to each other, the area of the region in which the first electrode and the second electrode are opposed to each other, and which constitutes the electrostatic actuator does not decrease. Therefore, it is possible to maintain the characteristics of the electrostatic actuator, and thus, the accuracy degradation in the gap control can also be suppressed.

In the variable wavelength interference filter according to the above aspect of the invention, it is preferable that a first extraction electrode connected to the first electrode, and a second extraction electrode connected to the second electrode are further provided, the first electrode has a plurality of first partial electrodes in the plan view, the first extraction electrode is disposed at a position, which does not overlap the second electrode and the second extraction electrode in the plan view, and the second extraction electrode is connected to the second electrode at a position, which overlaps an area between either two of the first partial electrodes in the plan view.

In general, in the case in which, for example, the first electrode is disposed on the surface of the first substrate, the surface being opposed to the second substrate, and the second electrode is disposed on the surface of the second substrate, the surface being opposed to the first substrate, there are provided the first extraction electrode connected to the first electrode for setting the potential of the first electrode and the second extraction electrode connected to the second electrode for setting the potential of the second electrode.

As such, if the variable wavelength interference filter is designed so that the first electrode and the second extraction electrode partially overlap each other, or the second electrode and the first extraction electrode partially overlap each other in the plan view, if a bonding misalignment between the substrates occurs, the area of the region where the electrode and the extraction electrode overlap each other varies. Further, even in the case in which it is designed that the first electrode and the second electrode only overlap each other, and the first extraction electrode or the second extraction electrode does not overlap the first electrode or the second electrode, there is a possibility that there occurs a region where the first electrode and the second extraction electrode, for example, overlap each other when the bonding misalignment occurs.

In contrast, in the preferable configuration described above, the first electrode is composed of a plurality of first partial electrodes, and the connection section between the second electrode and the second extraction electrode is opposed to the region between the first partial electrodes. In such a configuration, since the first electrode does not exist at the position corresponding to the connection section between the second electrode and the second extraction electrode even if the slight bonding misalignment occurs, there is no chance for the region where the second extraction electrode and the first electrode overlap each other to be formed. Further, since the first extraction electrode is disposed, for example, on the first peripheral edge of the first electrode, the first peripheral edge being located near the optical interference region, or on the second peripheral edge thereof located on the opposite side to the optical interference region, which does not overlap the second electrode even in the case in which bonding misalignment occurs, it is possible to easily avoid the overlap with the second electrode and the second extraction electrode.

Therefore, even in the case in which bonding misalignment occurs, the area of the region functioning as the electrostatic actuator does not change, and there is no chance for the characteristics of the electrostatic actuator to vary. Therefore, the electrostatic attractive force generated when applying the predetermined voltage to the electrostatic actuator does not change, and thus, the accuracy degradation of the cap control of the inter-reflecting film gap can be suppressed.

In the variable wavelength interference filter according to the above aspect of the invention, it is preferable that the first electrode has a first connection electrode disposed at a position, which does not overlap the second electrode and the second extraction electrode in the plan view, and adapted to connect the two first partial electrodes to each other.

In this preferable configuration, the first electrode is provided with the first connection electrode for connecting the first partial electrodes to each other. Thus, by connecting a single first extraction electrode to either of the plurality of first partial electrodes, or the first connection electrode, it is possible to set all of the first partial electrodes to the same electrical potential, and thus, simplification of the electrode shape can be achieved.

An optical filter device according to another aspect of the invention includes a variable wavelength interference filter including a first substrate, a second substrate opposed to the first substrate, a first reflecting film provided to the first substrate, a second reflecting film provided to the second substrate, and opposed to the first reflecting film across an inter-reflecting film gap, a first electrode provided to the first substrate, and a second electrode provided to the second substrate, and opposed to the first electrode, and a housing adapted to house the variable wavelength interference filter, the first electrode and the second electrode are disposed outside an optical interference region where the first reflecting film and the second reflecting film overlap each other in a plan view of the first substrate and the second substrate viewed from a substrate thickness direction, a first peripheral edge of the first electrode being located near the optical interference region, and being located nearer to the optical interference region than peripheral edges of the second electrode in the plan view, and a second peripheral edge of the first electrode being located on an opposite side to the optical interference region, and being located further from the optical interference region than the peripheral edges of the second electrode in the plan view.

In this aspect of the invention, similarly to the aspect of the invention described above, in the variable wavelength interference filter, the area of the region where the first electrode and the second electrode are opposed to each other does not vary even if bonding misalignment between the first substrate and the second substrate occurs. Therefore, it is possible to maintain the characteristics of the electrostatic actuator constituted by the first electrode and the second electrode, and thus, it is possible to accurately perform the gap control of the inter-reflecting film gap.

Further, since there is adopted the configuration in which the variable wavelength interference filter is housed in the housing, invasion of the foreign matters such as charged material or water particles can be suppressed. Thus, the variation of the gap between the first reflecting film and the second reflecting film and the deterioration of each of the reflecting films due to the adhesion of the charged material to the reflecting films can be prevented. Further, it is possible to enhance the protection of the variable wavelength interference filter during transportation, and the work efficiency when installing the variable wavelength interference filter into equipment.

An optical module according to still another aspect of the invention includes a first substrate, a second substrate opposed to the first substrate, a first reflecting film provided to the first substrate, a second reflecting film provided to the second substrate, and opposed to the first reflecting film across an inter-reflecting film gap, a first electrode provided to the first substrate, a second electrode provided to the second substrate, and opposed to the first electrode, and a detection section adapted to detect light taken out (transmitted) by the first reflecting film and the second reflecting film, the first electrode and the second electrode are disposed outside an optical interference region where the first reflecting film and the second reflecting film overlap each other in a plan view of the first substrate and the second substrate viewed from a substrate thickness direction, a first peripheral edge of the first electrode being located near the optical interference region, and being located nearer to the optical interference region than peripheral edges of the second electrode in the plan view, and a second peripheral edge of the first electrode being located on an opposite side to the optical interference region, and being located further from the optical interference region than the peripheral edges of the second electrode in the plan view.

In this aspect of the invention, similarly to the aspects of the invention described above, even in the case in which bonding misalignment between the first substrate and the second substrate occurs, the characteristics of the electrostatic actuator constituted by the first electrode and the second electrode can be maintained, and thus, it is possible to accurately take out the light with the desired target wavelength from the optical interference region. Therefore, according also to the optical module, by detecting the light with the target wavelength taken out with accuracy using the detection section, the accurate light intensity of the light with the target wavelength can be detected.

An electronic apparatus according to yet another aspect of the invention includes a variable wavelength interference filter including a first substrate, a second substrate opposed to the first substrate, a first reflecting film provided to the first substrate, a second reflecting film provided to the second substrate, and opposed to the first reflecting film across an inter-reflecting film gap, a first electrode provided to the first substrate, and a second electrode provided to the second substrate, and opposed to the first electrode, and a control section adapted to control the variable wavelength interference filter, the first electrode and the second electrode are disposed outside an optical interference region where the first reflecting film and the second reflecting film overlap each other in a plan view of the first substrate and the second substrate viewed from a substrate thickness direction, a first peripheral edge of the first electrode being located near the optical interference region, and being located nearer to the optical interference region than peripheral edges of the second electrode in the plan view, and a second peripheral edge of the first electrode being located on an opposite side to the optical interference region, and being located further from the optical interference region than the peripheral edges of the second electrode in the plan view.

In this aspect of the invention, similarly to the aspects of the invention described above, even in the case in which bonding misalignment between the first substrate and the second substrate occurs, the characteristics of the electrostatic actuator constituted by the first electrode and the second electrode can be maintained, and thus, it is possible to accurately take out the light with the desired target wavelength from the optical interference region. Therefore, according also to the electronic apparatus, a variety of electronic processing can correctly be performed based on the light with the target wavelength thus taken out with accuracy.

A variable wavelength interference filter according to still yet another aspect of the invention includes a first substrate, a second substrate opposed to the first substrate, a first reflecting film provided to the first substrate, a second reflecting film provided to the second substrate, and opposed to the first reflecting film across an inter-reflecting film gap, a first electrode provided to the first substrate, and having a first width in a plan view of the first substrate and the second substrate viewed from a substrate thickness direction, and a second electrode provided to the second substrate, opposed to the first electrode, and having a second width in the plan view, and the first width dimension is larger than the second width dimension.

In this aspect of the invention, similarly to the aspects of the invention described above, the area of the region where the first electrode and the second electrode are opposed to each other does not vary even if the bonding misalignment between the first substrate and the second substrate occurs. Therefore, it is possible to maintain the characteristics of the electrostatic actuator constituted by the first electrode and the second electrode, and thus, it is possible to accurately perform the gap control of the inter-reflecting film gap.

A variable wavelength interference filter according to further another aspect of the invention includes a first substrate, a second substrate opposed to the first substrate, a first reflecting film provided to the first substrate, a second reflecting film provided to the second substrate, and opposed to the first reflecting film across an inter-reflecting film gap, a first electrode provided to the first substrate, and having a first width in a plan view of the first substrate and the second substrate viewed from a substrate thickness direction, and a second electrode provided to the second substrate, opposed to the first electrode, and having a second width in the plan view, and the second electrode is formed within a footprint of the first electrode in the plan view.

Also in this aspect of the invention, similarly to the aspects of the invention described above, the area of the region where the first electrode and the second electrode are opposed to each other does not vary even if bonding misalignment between the first substrate and the second substrate occurs. Therefore, it is possible to maintain the characteristics of the electrostatic actuator constituted by the first electrode and the second electrode, and thus, it is possible to accurately perform the gap control of the inter-reflecting film gap.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

First Embodiment

A first embodiment of the invention will hereinafter be explained with reference to the accompanying drawings.
Configuration of Spectroscopic Measurement Device FIG. 1 is a block diagram showing a schematic configuration of a spectroscopic measurement device according to the first embodiment of the invention.

The spectroscopic measurement device 1 is an example of an electronic apparatus according to the invention, and analyzes a light intensity of a predetermined wavelength in a measurement target light reflected by a measurement target X, and measures a dispersion spectrum.

Figure 1:
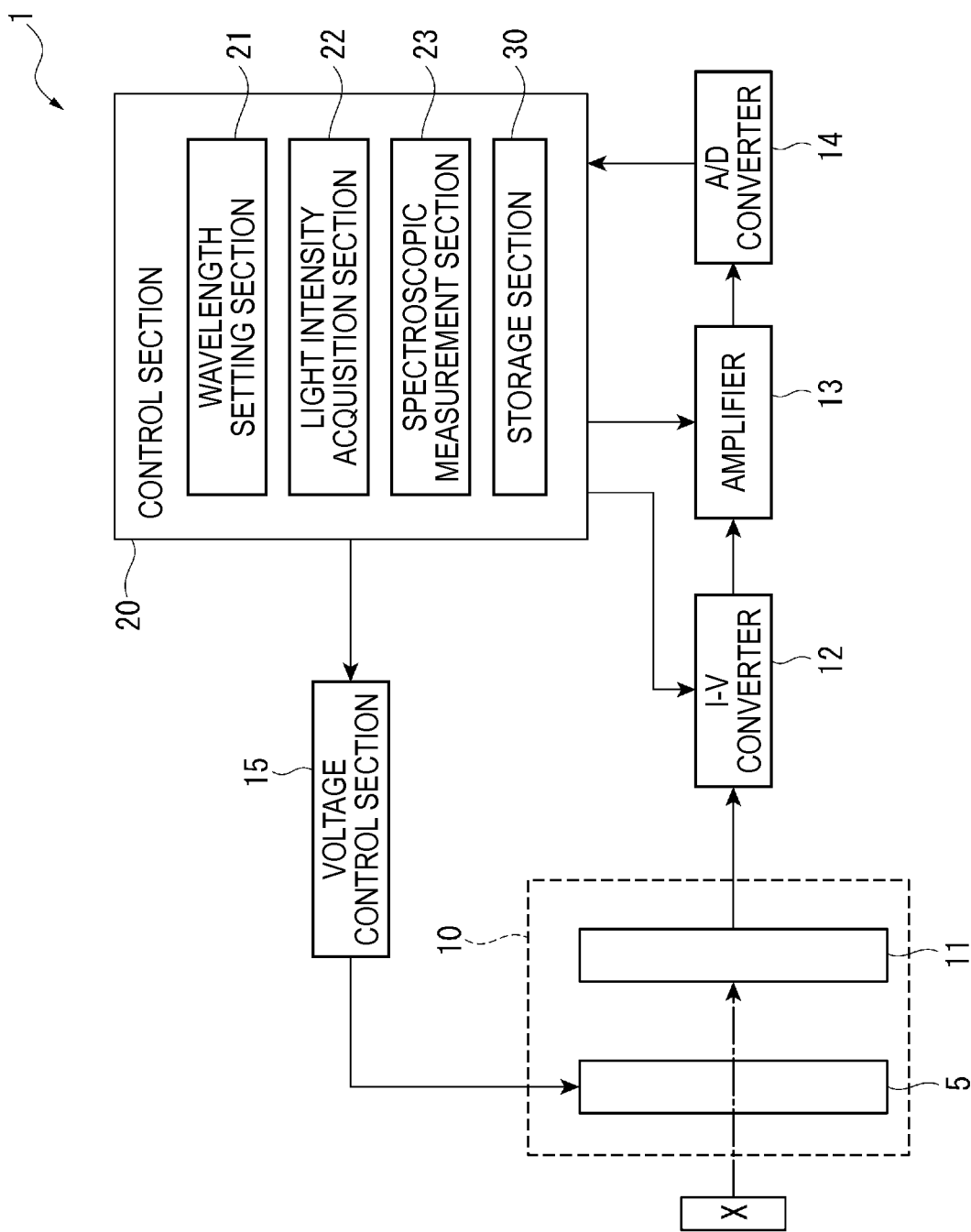
FIG. 1 is a block diagram showing a schematic configuration of a spectroscopic measurement device according to a first embodiment of the invention.

As shown in FIG. 1, the spectroscopic measurement device 1 is provided with an optical module 10, an I-V converter 12, an amplifier 13, an A/D converter 14, a voltage control section 15, and a control section 20. Further, the optical module 10 is configured including a variable wavelength interference filter 5 and a detector 11 (a detection section).

The I-V converter 12 converts the detection signal input from the detector 11 into a voltage value, and then outputs it to the amplifier 13.

The amplifier 13 amplifies a voltage (a detection voltage), which corresponds to the detection signal input from the I-V converter 12.

The A/D converter 14 converts the detection voltage (an analog signal) input from the amplifier 13 into a digital signal, and then outputs it to the control section 20.

The voltage control section 15 drives the variable wavelength interference filter 5 based on the control by the control section 20 to thereby transmit the light with the target wavelength through the variable wavelength interference filter 5.
Configuration of Optical Module Next, the configuration of the optical module 10 will hereinafter be explained.

As shown in FIG. 1, the optical module 10 is configured including the detector 11 (a detection section) and the variable wavelength interference filter 5.

Figure 2:
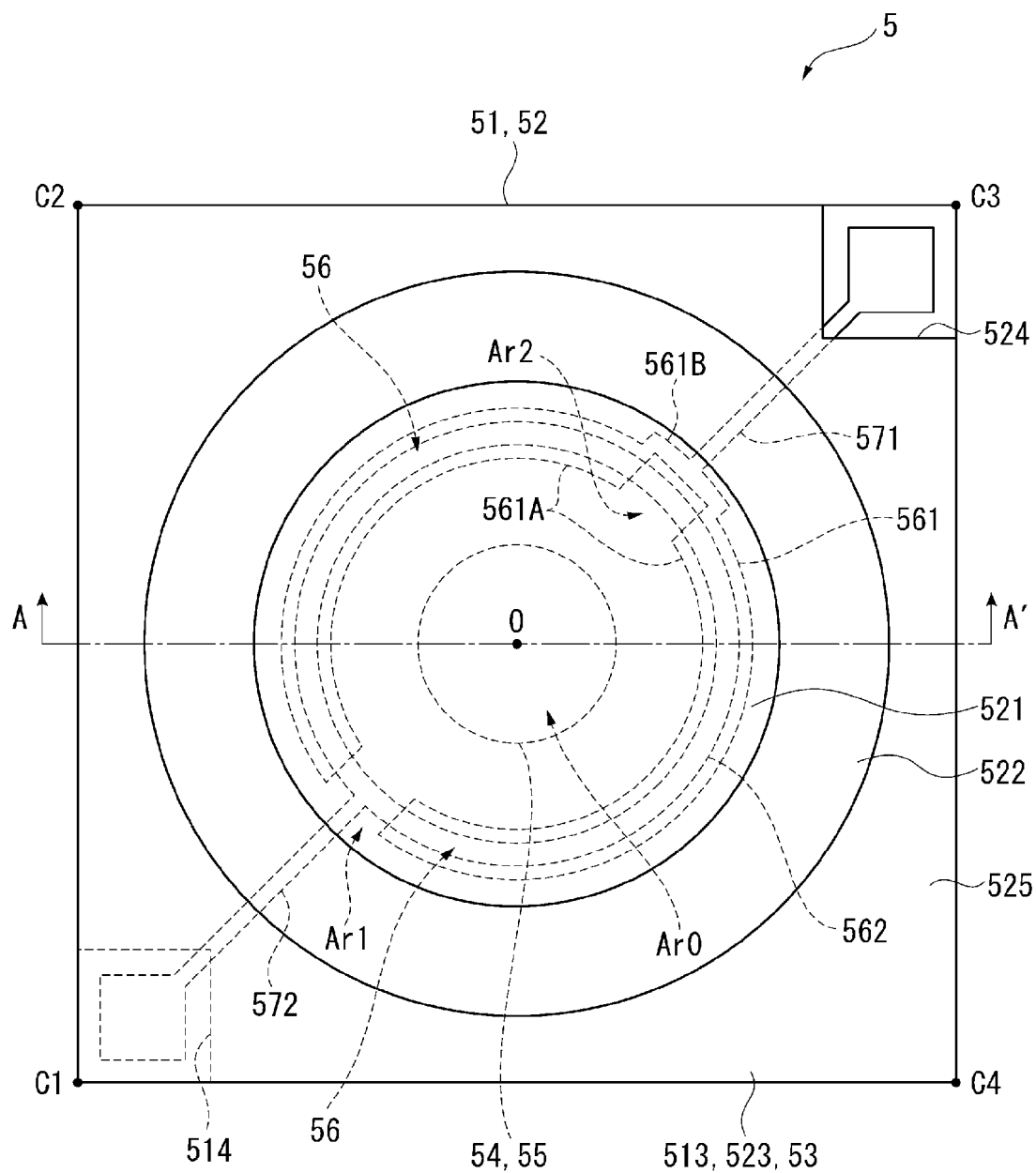
FIG. 2 is a plan view showing a schematic configuration of a variable wavelength interference filter according to the first embodiment.
Figure 3:
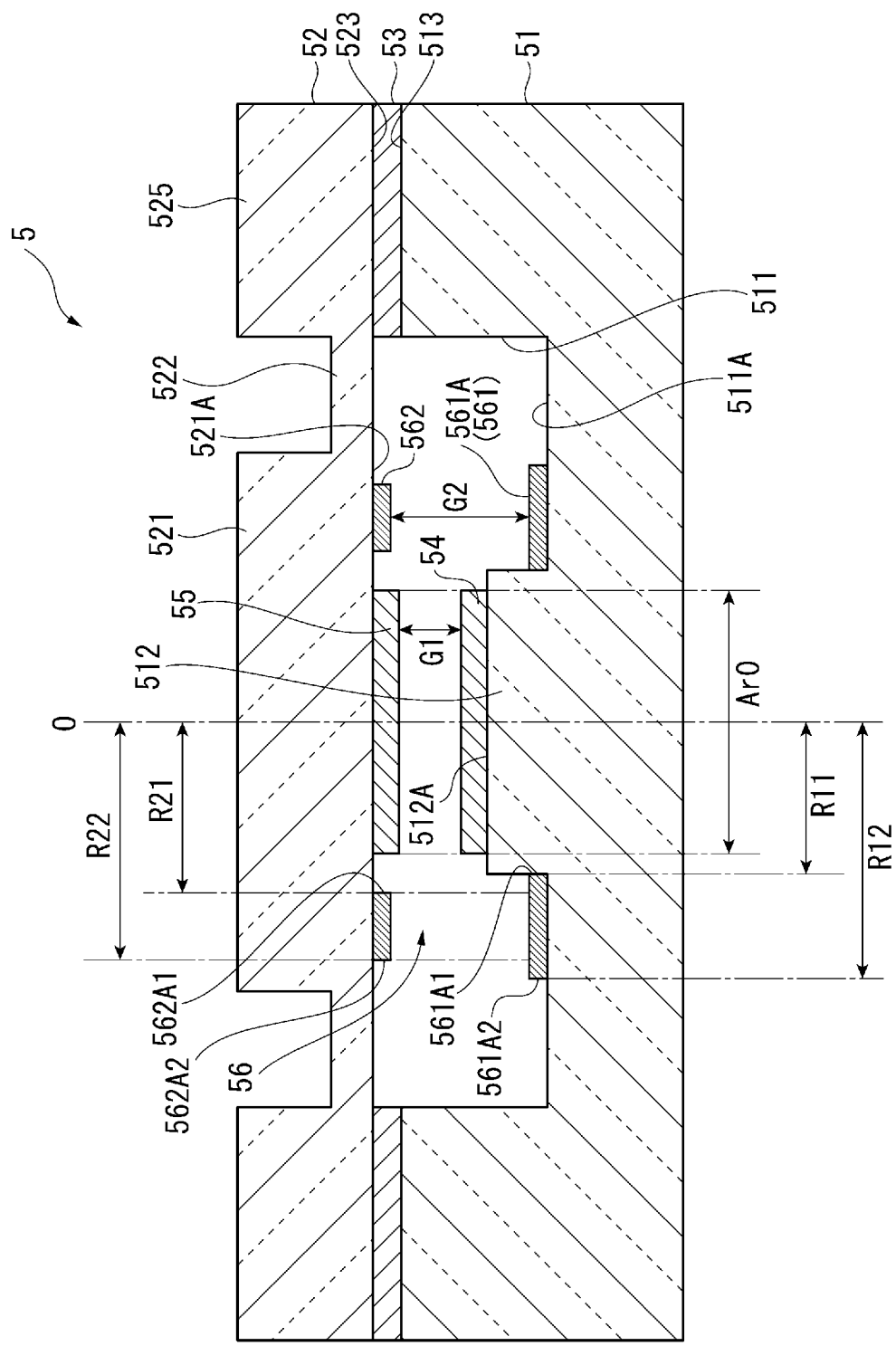
FIG. 3 is a cross-sectional view of the variable wavelength interference filter shown in FIG. 2 along the A-A' line.

The detector 11 receives the light transmitted through the variable wavelength interference filter 5 of the optical module 10, and then outputs a detection signal (an electrical current) corresponding to the light intensity of the light thus received.
Configuration of Variable Wavelength Interference Filter The variable wavelength interference filter 5 of the optical module will hereinafter be explained. FIG. 2 is a plan view showing a schematic configuration of the variable wavelength interference filter 5. FIG. 3 is a cross-sectional view of the variable wavelength interference filter shown in FIG. 2 along the A-A' line.

As shown in FIGS. 2 and 3, the variable wavelength interference filter 5 is an optical member having, for example, a rectangular plate shape, and is provided with a stationary substrate 51 (a first substrate) and a movable substrate 52 (a second substrate). The stationary substrate 51 and the movable substrate 52 are each formed of a variety of types of glass, quartz crystal, or the like, and are integrally configured by bonding a first bonding section 513 of the stationary substrate 51 and a second bonding section 523 of the movable substrate 52 to each other with a bonding film 53 formed of, for example, a plasma-polymerized film consisting primary of, for example, siloxane.

The stationary substrate 51 is provided with a stationary reflecting film 54 constituting the first reflecting film in the embodiment of the invention, and the movable substrate 52 is provided with a movable reflecting film 55 constituting the second reflecting film in the embodiment of the invention. The stationary reflecting film 54 and the movable reflecting film 55 are disposed so as to be opposed to each other across an inter-reflecting film gap G1. Further, in a plan view (hereinafter referred to as a filter plan view) of the stationary substrate 51 and the movable substrate 52 viewed from the substrate thickness direction, the region where the stationary reflecting film 54 and the movable reflecting film 55 overlap each other constitutes an optical interference region Ar0. Further, the light transmitted through the optical interference region Ar0 is detected by the detector 11.

Further, the stationary substrate 51 is provided with a stationary electrode 561 (a first electrode), and the movable substrate 52 is provided with a movable electrode 562 (a second electrode). Further, in the filter plan view, the region where the stationary electrode 561 and the movable electrode 562 overlap each other constitutes an electrostatic actuator 56.

Further, in the present embodiment, the center point of the stationary reflecting film 54 and the center point of the movable reflecting film 55 coincide with each other in the filter plan view, and the center points of these reflecting films in the plan view are referred to as a filter center point O.
Configuration of Stationary Substrate The stationary substrate 51 is formed to have a thickness dimension larger than that of the movable substrate 52, and no distortion is caused in the stationary substrate 51 by the electrostatic attractive force due to the electrostatic actuator 56 or the internal stress of a film member (e.g., the stationary reflecting film 54) formed on the stationary substrate 51.

As shown in FIG. 3, the stationary substrate 51 is provided with an electrode arrangement groove 511 and a reflecting film installation section 512 each formed by, for example, etching. Further, as shown in FIG. 2, a part (a vertex C1) of an outer peripheral edge of the stationary substrate 51 is provided with a cutout portion 514, and thus, there is provided a configuration in which a movable extraction electrode 572 described later is exposed from the cutout portion 514 to the surface of the variable wavelength interference filter 5.

The electrode arrangement groove 511 is formed to have a ring-like shape centered on the filter center point O of the stationary substrate 51 in the filter plan view. The reflecting film installation section 512 is formed so as to protrude toward the movable substrate 52 from the central portion of the electrode arrangement groove 511 in the filter plan view.

The bottom surface of the electrode arrangement groove 511 forms an electrode installation surface 511A on which the stationary electrode 561 of the electrostatic actuator 56 is disposed. Further, a projection tip surface of the reflecting film installation section 512 forms a reflecting film installation surface 512A on which the stationary reflecting film 54 is disposed.

Figure 4:
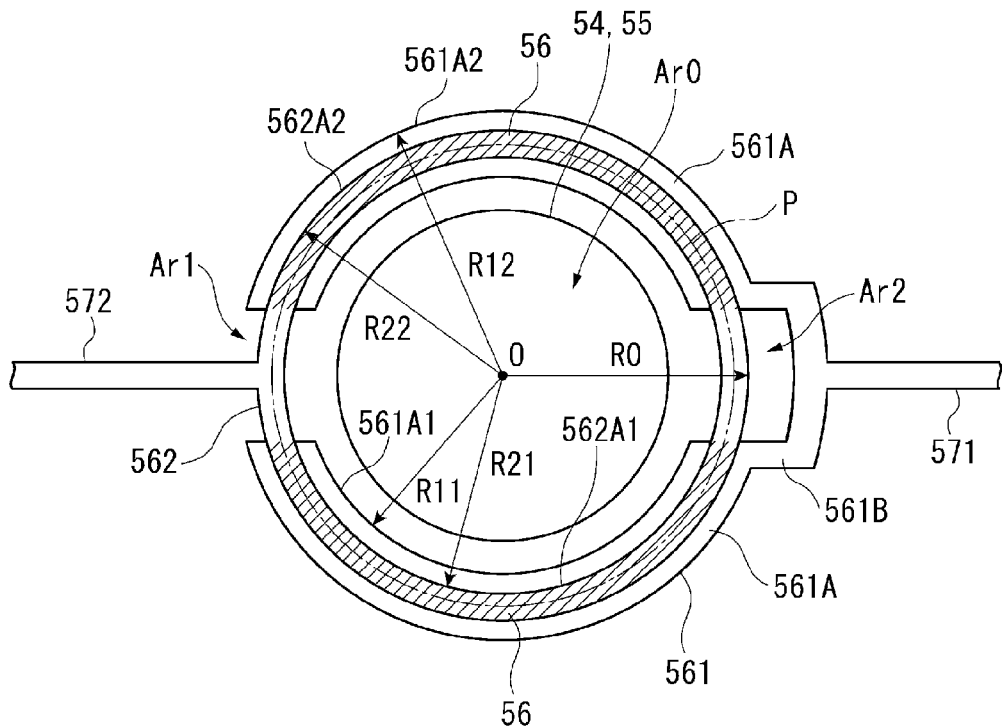
FIG. 4 is a plan view showing a configuration of the electrodes constituting an electrostatic actuator according to the first embodiment.

FIG. 4 is a diagram showing a configuration of the electrodes of the present embodiment. It should be noted that the area indicated by hatching in FIG. 4 is a region where the stationary electrode 561 and the movable electrode 562 overlap each other, and functions as the electrostatic actuator 56.

The electrode installation surface 511A of the electrode arrangement groove 511 is provided with the stationary electrode 561. The stationary electrode 561 is disposed in an area out of the electrode installation surface 511A, the area being opposed to a movable section 521 described later.

Specifically, as shown in FIG. 4, the stationary electrode 561 is provided with two stationary partial electrodes 561A to be point-symmetric with respect to the filter center point O, and a stationary connection electrode 561B for connecting these stationary partial electrodes 561A to each other.

The stationary partial electrodes 561A are each formed to have an arc shape along an imaginary circle P with a radius R0 centered on the filter center point O, the arc shape having an inner peripheral edge 561A1 with a radius R11 (R11<R0) and an outer peripheral edge 561A2 with a radius R12 (R0<R12). Therefore, no electrode is disposed on the stationary substrate 51 in the regions (a first end-to-end region Ar1, a second end-to-end region Ar2) between the ends of the stationary partial electrodes 561A on the imaginary circle P.

Here, the width dimension (R12-R11) of each of the stationary partial electrodes 561A corresponds to a first width dimension of the embodiment of the invention.

Further, the stationary connection electrode 561B connects the ends (the ends opposed to each other across the second end-to-end region Ar2) of the two stationary partial electrodes 561A to each other, the ends being located on the sides near a vertex C3. The stationary connection electrode 561B extends from the outer peripheral edges 561A2 at the ends of the respective stationary partial electrodes 561A toward the outside of the diameter of the imaginary circle P, and thus connects the two stationary partial electrodes 561A to each other. Therefore, the stationary connection electrode 561B is disposed outside the diameter of the outer peripheral edge 561A2 with the radius R12, and does not overlap the movable electrode 562 described later in the filter plan view.

Further, as shown in FIGS. 2 and 4, a stationary extraction electrode 571 is connected to the stationary connection electrode 561B. As shown in FIG. 2, the stationary extraction electrode 571 extends to the vertex C3, and is exposed from a cutout portion 524 described later provided to the movable substrate 52 in the vertex C3. It should be noted that the stationary substrate 51 is provided with extraction electrode arrangement grooves (not shown) extending from the electrode arrangement groove 511 toward the vertex C1 and the vertex C3, and the stationary extraction electrode 571 is arranged along the one of these extraction electrode arrangement grooves extending toward the vertex C3. Further, a tip portion of the stationary extraction electrode 571 is connected to the voltage control section 15 with, for example, flexible printed circuits (FPC) or lead wires in the vertex C3.

As described above, the reflecting film installation section 512 is formed to have a roughly columnar shape coaxial with the electrode arrangement groove 511 and having a diameter smaller than that of the electrode arrangement groove 511, and is provided with the reflecting film installation surface 512A opposed to the movable substrate 52.

As shown in FIG. 3, the stationary reflecting film 54 is installed in the reflecting film installation section 512. As the stationary reflecting film 54, a metal film made of, for example, Ag, or a conductive alloy film made of, for example, an Ag alloy can be used. Further, a dielectric multilayer film with a high refractive index layer made of, for example, $TiO_2$, and a low refractive index layer made of, for example, $SiO_2$ can also be used as the stationary reflecting film 54.

Further, it is also possible to form an antireflection film on a plane of incidence of light (the surface not provided with the stationary reflecting film 54) of the stationary substrate 51 at a position corresponding to the stationary reflecting film 54. The antireflection film can be formed by alternately stacking low refractive index films and high refractive index films, and decreases the reflectance of the visible light on the surface of the stationary substrate 51, while increasing the transmittance thereof.

Further, the surface of the stationary substrate 51, which is opposed to the movable substrate 52, and is not provided with the electrode arrangement groove 511, the reflecting film installation section 512, and the extraction electrode grooves, constitutes the first bonding section 513. The first bonding section 513 is bonded to the second bonding section 523 of the movable substrate 52 with the bonding film 53.

Configuration of Movable Substrate

As shown in FIGS. 2 and 3, in the filter plan view, the movable substrate 52 is provided with the movable section 521 having a circular shape centered on the filter center point O, a holding section 522 coaxial with the movable section 521 and for holding the movable section 521, and a substrate peripheral section 525 disposed outside the holding section 522.

Further, as shown in FIG. 2, the movable substrate 52 is provided with the cutout portion 524 in the vertex C3, and as described above, the tip portion of the stationary extraction electrode 571 is exposed from the cutout portion 524.

The movable section 521 is formed to have a thickness dimension larger than that of the holding section 522, and is formed in the present embodiment, for example, to have the same thickness dimension as that of the movable substrate 52 (the substrate peripheral section 525). The movable section 521 is formed to have a diameter larger than at least the diameter of the outer peripheral edge of the reflecting film installation surface 512A in the filter plan view. Further, the movable reflecting film 55 and the movable electrode 562 are disposed on a movable surface 521A of the movable section 521, the movable surface 521A being opposed to the stationary substrate 51.

It should be noted that it is also possible to form an antireflection film on the surface of the movable section 521 opposite to the stationary substrate 51 similarly to the case of the stationary substrate 51.

As shown in FIG. 4, the movable electrode 562 is disposed on the outer peripheral side of the movable reflecting film 55 (the optical interference region Ar0) in the filter plan view. The movable electrode 562 is formed to have an annular shape along the imaginary circle P, the annular shape having an inner peripheral edge 562A1 with a radius R21 (R11<R21<R0) and an outer peripheral edge 562A2 with a radius R22 (R0<R22<R12).

Therefore, in the filter plan view, the movable electrode 562 does not overlap the stationary electrode 561 in the regions (the first end-to-end region Ar1, the second end-to-end region Ar2) between the ends of the two outer peripheral edges 561A2.

Here, the width dimension (R22-R21) of the movable electrode 562 corresponds to a second width dimension of the embodiment of the invention, and is smaller than the width dimension (R12-R11) of the stationary partial electrodes 561A, and the movable electrode 562 is arranged inside the stationary partial electrodes 561A in the opposed region forming the electrostatic actuator 56 in the filter plan view.

Further, in the first end-to-end region Ar1 on the side located on the vertex C1 side, the movable extraction electrode 572 is connected to the movable electrode 562. As shown in FIG. 2, the movable extraction electrode 572 extends to the vertex C1, and is exposed from the cutout portion 514 provided to the stationary substrate 51 to the outer surface of the variable wavelength interference filter 5 in the vertex C1. It should be noted that the movable extraction electrode 572 is arranged so as to be opposed to the extraction electrode arrangement groove extending toward the vertex C1 of the stationary substrate 51. Further, a tip portion of the movable extraction electrode 572 is connected to the voltage control section 15 with, for example, FPC or lead wires in the vertex C1.

As shown in FIG. 4, in the electrode configuration described above, the arc region (the region indicated by hatching in FIG. 4) where the stationary electrode 561 and the movable electrode 562 overlap each other in the filter plan view constitutes the electrostatic actuator 56.

It should be noted that in the present embodiment, although an inter-electrode gap G2 between the stationary electrode 561 and the movable electrode 562 is formed to be larger than the inter-reflecting film gap G1 in the region where the electrostatic actuator 56 is constituted as shown in FIG. 3, the invention is not limited thereto. It is also possible to adopt a configuration in which the inter-reflecting film gap G1 is larger than the inter-electrode gap G2 depending on the wavelength band of the measurement target light in the case of targeting, for example, an infrared beam or a far infrared beam as the measurement target light.

The holding section 522 is a diaphragm surrounding the periphery of the movable section 521, and is formed to have a thickness dimension smaller than that of the movable section 521. Such a holding section 522 is easier to deflect than the movable section 521, and it becomes possible to displace the movable section 521 toward the stationary substrate 51 with a weak (small) electrostatic attractive force. As such, since the movable section 521 has a larger thickness dimension and higher rigidity than those of the holding section 522, the change in shape of the movable section 521 is suppressed even in the case in which the holding section 522 is pulled toward the stationary substrate 51 due to the electrostatic attractive force. Therefore, deflection of the movable reflecting film 55 provided to the movable section 521 is also suppressed, and it becomes possible to keep the stationary reflecting film 54 and the movable reflecting film 55 in a parallel state.

It should be noted that although the holding section 522 having a diaphragm shape is shown as an example in the present embodiment, the shape is not limited thereto and a configuration of, for example, providing beam-like holding sections arranged at regular angular intervals centered on the filter center point O can also be adopted.

As described above, the substrate peripheral section 525 is disposed outside the holding section 522 in the filter plan view. The second bonding section 523 opposed to the first bonding section 513 is disposed on the surface of the substrate peripheral section 525, the surface being opposed to the stationary substrate 51, and is bonded to the first bonding section 513 via the bonding film 53.

The control section 20 is configured by combining, for example, a CPU and a memory with each other, and controls an overall operation of the spectroscopic measurement device 1. As shown in FIG. 1, the control section 20 is provided with a wavelength setting section 21, a light intensity acquisition section 22, and a spectroscopic measurement section 23.

Further, the control section 20 is provided with a storage section 30 for storing a variety of types of data, and the storage section 30 stores V-λ data for controlling the electrostatic actuator 56.

As the V-λ data, the peak wavelength of the light transmitted through the optical interference region Ar0 corresponding to the voltage to be applied to the electrostatic actuator 56 is recorded.

The wavelength setting section 21 sets the target wavelength of the light to be taken out (transmitted) by the variable wavelength interference filter 5, and at the same time reads in the target voltage value corresponding to the target wavelength thus set from the V-λ data stored in the storage section 30. Then, the wavelength setting section 21 outputs a control signal instructing to apply the target voltage value thus read to the voltage control section 15. Thus, the voltage with the target voltage value is applied to the electrostatic actuator 56 from the voltage control section 15.

The light intensity acquisition section 22 obtains the light intensity of the light with the target wavelength transmitted through the variable wavelength interference filter 5 based on the light intensity obtained by the detector 11.

The spectroscopic measurement section 23 measures the spectrum characteristics of the measurement target light based on the light intensity obtained by the light intensity acquisition section 22.

Method of Manufacturing Variable Wavelength Interference Filter

Next, a method of manufacturing such a variable wavelength interference filter as described above will be explained with reference to the accompanying drawings.

Figure 5:
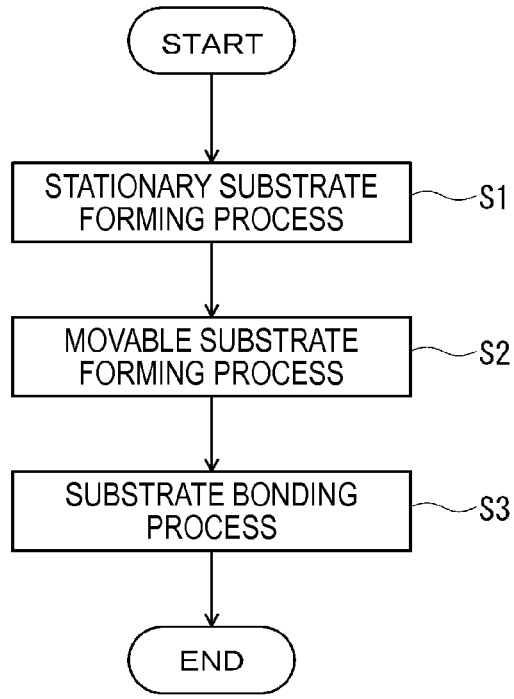
FIG. 5 is a flowchart showing a manufacturing method of the variable wavelength interference filter according to the first embodiment.

FIG. 5 is a flowchart showing a manufacturing process of the variable wavelength interference filter.

In the manufacturing process of the variable wavelength interference filter 5, a first glass substrate M1 for forming the stationary substrate 51 and a second glass substrate M2 for forming the movable substrate 52 are firstly prepared, and then a stationary substrate forming process S1 and a movable substrate forming process S2 are performed. Subsequently, a substrate bonding process S3 is performed to bond the first glass substrate M1 processed in the stationary substrate forming process S1 and the second glass substrate M2 processed in the movable substrate forming process S2 to each other, and then the variable wavelength interference filters 5 are cut chip by chip.

Each of the processes S1 through S3 will hereinafter be explained with reference to the accompanying drawings.

Stationary Substrate Forming Process

Figure 6A:
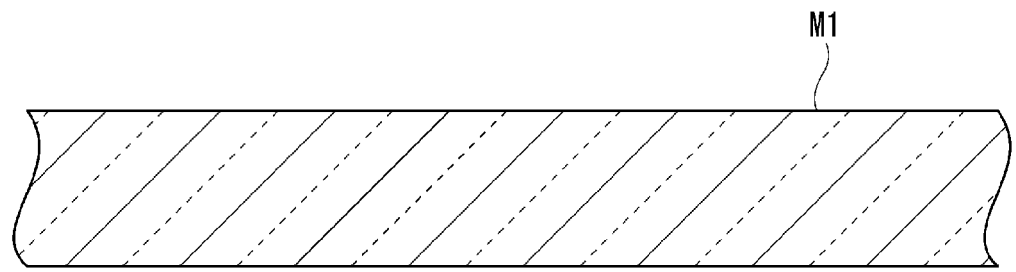
FIGS. 6A through 6C are diagrams for explaining a stationary substrate forming process shown in FIG. 5.
Figure 6B:
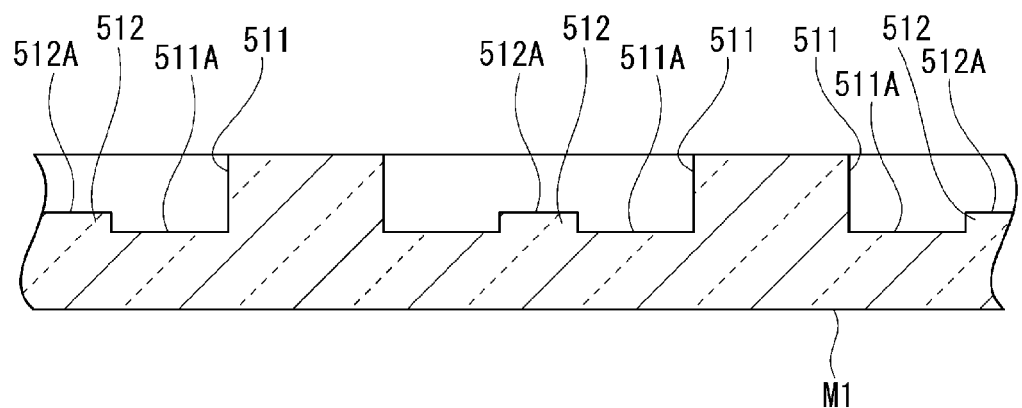
Figure 6C:
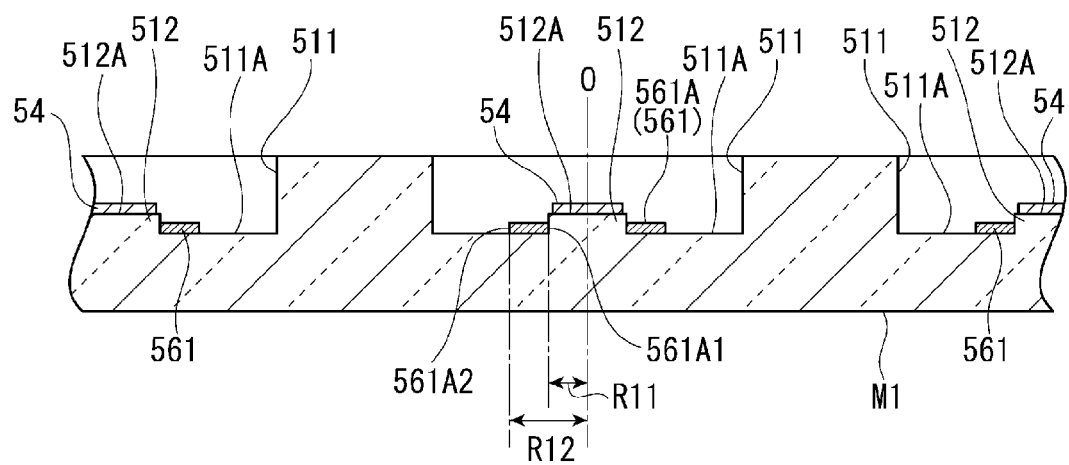

FIGS. 6A through 6C are diagrams showing the state of the first glass substrate M1 in the stationary substrate forming process S1.

In the stationary substrate forming process S1, firstly, fine polishing is performed on both of the surfaces of the first glass substrate M1, which is a manufacturing material of the stationary substrate 51, until the surface roughness Ra becomes equal to or lower than 1 nm as shown in FIG. 6A.

Then, as shown in FIG. 6B, the substrate surface of the first glass substrate M1 is processed by etching.

Specifically, the substrate surface of the first glass substrate M1 is coated with a resist, and the resist thus applied is then exposed and developed using a photolithography method to thereby perform patterning so that an opening is formed in the place where the reflecting film installation surface 512A is formed. Here, in the present embodiment, a plurality of stationary substrates 51 is formed from one first glass substrate M1. Therefore, in this process, the resist pattern is formed on the first glass substrate M1 so that the plurality of stationary substrates 51 is manufactured in the state of being arranged in parallel to each other forming an array shape.

Then, a wet etching process using, for example, a hydrofluoric acid type agent is performed on both of the surfaces of the first glass substrate M1. Preferably, the etching process is performed until the depth dimension of the reflecting film installation surface 512A is reached. Subsequently, the resist is formed so as to have openings in the places where the electrode arrangement groove 511 and the extraction electrode arrangement grooves are formed, and then the wet etching process is further performed.

Thus, as shown in FIG. 6B, the first glass substrate M1 in which the substrate shape of the stationary substrate 51 is determined is formed.

Subsequently, an electrode material for forming the stationary electrode 561 and the stationary extraction electrode 571 is deposited on the surface of the first glass substrate M1 on which the etching process has been performed, and is then patterned using a photolithography method or the like.

Preferably, the patterning is performed so that the inner peripheral edges 561A1 of the stationary partial electrodes 561A are located inside the inner peripheral edge 562A1 of the movable electrode 562, and the outer peripheral edges 561A2 of the stationary partial electrodes 561A are located outside the outer peripheral edge 562A2 of the movable electrode 562 in the filter plan view. Here, the dimension (R21-R11) from the inner peripheral edge 561A1 of the stationary partial electrode 561A to the inner peripheral edge 562A1 of the movable electrode 562 and the dimension (R12-R22) from the outer peripheral edge 561A2 of the stationary partial electrode 561A to the outer peripheral edge 562A2 of the movable electrode 562 are set to have a margin equal to or larger than the bonding accuracy in bonding the first glass substrate M1 and the second glass substrate M2 (the stationary substrate 51 and the movable substrate 52) to each other in the substrate bonding process S3.

Specifically, there is a possibility that a bonding misalignment may occur when bonding the first glass substrate M1 and the second glass substrate M2 to each other, and the maximum misalignment amount can be pre-estimated based on the bonding conditions, the bonding method, and so on. Therefore, the dimension (R21-R11) and the dimension (R12-R22) are set to be equal to or larger than the maximum misalignment amount.

Further, in the present embodiment, the connection section between the movable electrode 562 and the movable extraction electrode 572 is disposed in an area opposed to the first end-to-end region Ar1. Preferably, the dimension between the ends of the stationary partial electrodes 561A opposed to each other in the first end-to-end region Ar1 is set so that the stationary partial electrodes 561A and the movable extraction electrode 572 do not overlap each other even in the case in which bonding misalignment occurs. In other words, the dimension between the edge of the movable extraction electrode 572 and the end of the stationary partial electrode 561A is set to have a margin equal to or larger than the maximum misalignment amount in the filter plan view.

Further, in the case of depositing an insulating layer on the stationary electrode 561, a $SiO_2$ film with a thickness of about, for example, 100 nm is deposited on the entire first glass substrate M1 using, for example, plasma CVD after forming the electrode. Subsequently, $SiO_2$ in the tip portion (the part to which the FPC or the lead wires are connected) of the stationary extraction electrode 571 is removed by, for example, a dry etching process or the like.

Then, the stationary reflecting film 54 is formed on the reflecting film installation section 512. In the present embodiment, an Ag alloy is used as the stationary reflecting film 54. In the case of using the metal film made of, for example, Ag or the alloy film made of, for example, an Ag alloy, the reflecting film (the metal film or the alloy film) is formed on the surface of the first glass substrate M1, and then the patterning is performed using a photolithography method or the like.

It should be noted that in the case of forming a dielectric multilayer film as the reflecting film, the patterning can be performed by, for example, a liftoff process. Preferably, the resist (a liftoff pattern) is formed on the first glass substrate M1 except the part where the reflecting film is formed by the photolithography method or the like. Subsequently, a material (e.g., a dielectric multilayer film with the high refractive index layer made of $TiO_2$ and the low refractive index layer made of $SiO_2$) for forming the stationary reflecting film 54 is deposited using a sputtering method, an evaporation method, or the like. Then, after depositing the stationary reflecting film 54, the film in unnecessary parts is removed by a liftoff process.

It should be noted that in the case of using reflecting films different in type from each other as the stationary reflecting film 54, the process described above is performed individually to thereby form the reflecting film.

According to the process described above, the first glass substrate M1 with a plurality of stationary substrates 51 arranged in an array shape as shown in FIG. 6C is manufactured.

Movable Substrate Forming Process

Figure 7A:
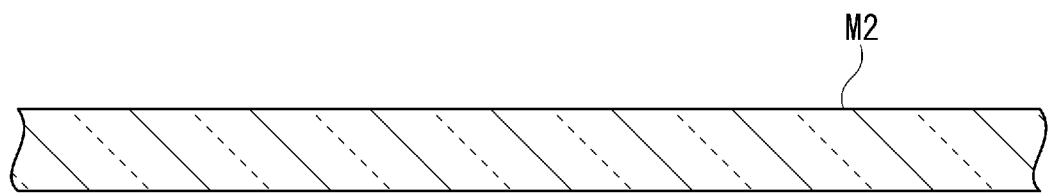
FIGS. 7A through 7C are diagrams for explaining a movable substrate forming process shown in FIG. 5.
Figure 7B:
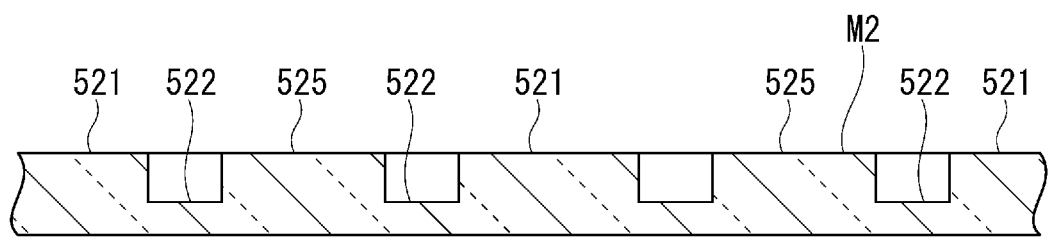
Figure 7C:
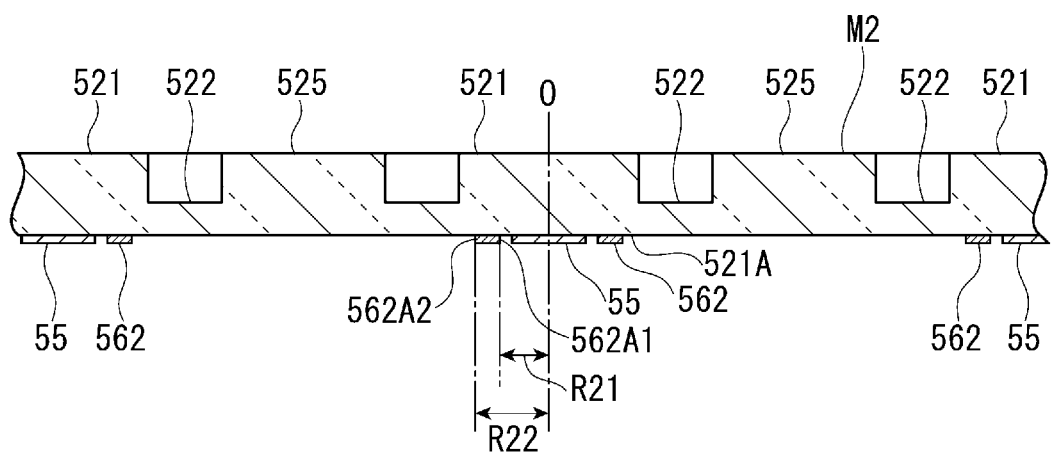

Next, the movable substrate forming process S2 will be explained. FIGS. 7A through 7C are diagrams showing the state of the second glass substrate M2 in the movable substrate forming process S2.

In the movable substrate forming process S2, firstly, fine polishing is performed on both of the surfaces of the second glass substrate M2 until the surface roughness Ra becomes equal to or lower than 1 nm as shown in FIG. 7A. Then, a resist is applied to the entire surface of the second glass substrate M2, and the resist thus applied is exposed and then developed using a photolithography method to thereby be patterned to form a place where the holding section 522 is to be formed.

Then, by performing a wet etching process on the second glass substrate M2, the movable section 521, the holding section 522, and the substrate peripheral section 525 are formed as shown in FIG. 7B. Thus, the second glass substrate M2 in which the substrate shape of the movable substrate 52 is determined is manufactured.

Then, the movable electrode 562 and the movable extraction electrode 572 are formed on the surface (the surface opposed to the stationary substrate 51) on one side of the second glass substrate M2.

Specifically, similarly to the stationary electrode 561 described above, by depositing the electrode material on the second glass substrate M2, and then patterning the electrode material using a photolithography method, the movable electrode 562 and the movable extraction electrode 572 are formed.

Preferably, the patterning is performed so that the inner peripheral edge 562A1 of the movable electrode 562 is located outside the inner peripheral edge 561A1 of the stationary electrode 561, and the outer peripheral edge 562A2 of the movable electrode 562 is located inside the outer peripheral edge 561A2 of the stationary electrode 561 in the filter plan view.

Subsequently, the movable reflecting film 55 is formed on the movable surface 521A. The movable reflecting film 55 can be formed by substantially the same method as in the case of the stationary reflecting film 54.

According to the process described above, the second glass substrate M2 with a plurality of movable substrates 52 arranged in an array shape as shown in FIG. 7C is manufactured.

Substrate Bonding Process

Figure 8:
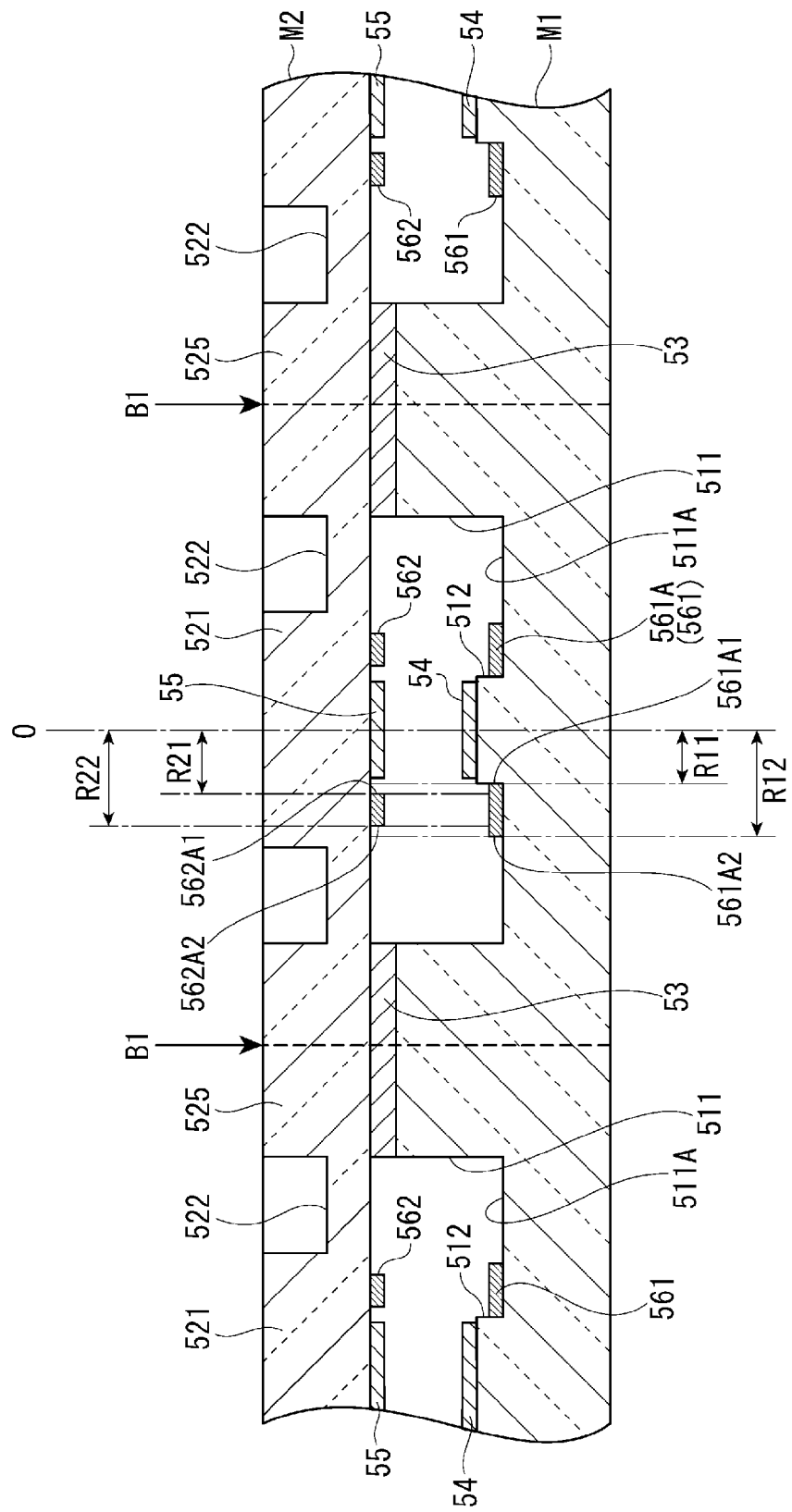
FIG. 8 is a diagram for explaining a substrate bonding process shown in FIG. 5.

Next, the substrate bonding process S3 will be explained. FIG. 8 is a diagram showing the state of the first glass substrate M1 and the second glass substrate M2 in the substrate bonding process S3.

In the substrate bonding process S3, firstly, a plasma-polymerized film (a bonding film 53) consisting primary of polyorganosiloxane is deposited on each of the first bonding section 513 of the first glass substrate M1 and the second bonding section 523 of the second glass substrate M2 using, for example, a plasma CVD method. The thickness of the bonding film 53 may be a value in a range of, for example, 10 nm through 1000 nm.

Then, in order to apply the activation energy to the plasma-polymerized films of the first glass substrate M1 and the second glass substrate M2, an $O_2$ plasma process or a UV process is performed. The $O_2$ plasma process is performed for 30 seconds in the condition in which the $O_2$ flow rate is $1.8 \times 10{-3}$ ($m^3/h$), the pressure is 27 Pa, and the RF power is 200 W. Further, the UV process is performed for 3 minutes using excimer UV (wavelength of 172 nm) as the UV source.

After applying the activation energy to the plasma-polymerized film, an alignment adjustment of the first glass substrate M1 and the second glass substrate M2 is performed, then the first glass substrate M1 and the second glass substrate M2 are made to overlap each other via the plasma-polymerized films, and a weight of, for example, 98 (N) is applied to the bonding section for 10 minutes. Thus, the first glass substrate M1 and the second glass substrate M2 are bonded to each other.

Sometimes, a slight bonding misalignment might occur between the first glass substrate M1 and the second glass substrate M2 due to the weight in the bonding process. The expected maximum misalignment amount of the bonding misalignment varies in accordance with the bonding conditions or the bonding method.

To cope with the above, in the present embodiment, there are provided margins equal to or larger than the maximum misalignment amount respectively between the inner peripheral edge 561A1 of the stationary electrode 561 and the inner peripheral edge 562A1 of the movable electrode 562, and between the outer peripheral edge 561A2 of the stationary electrode 561 and the outer peripheral edge 562A2 of the movable electrode 562.

Figure 9A:
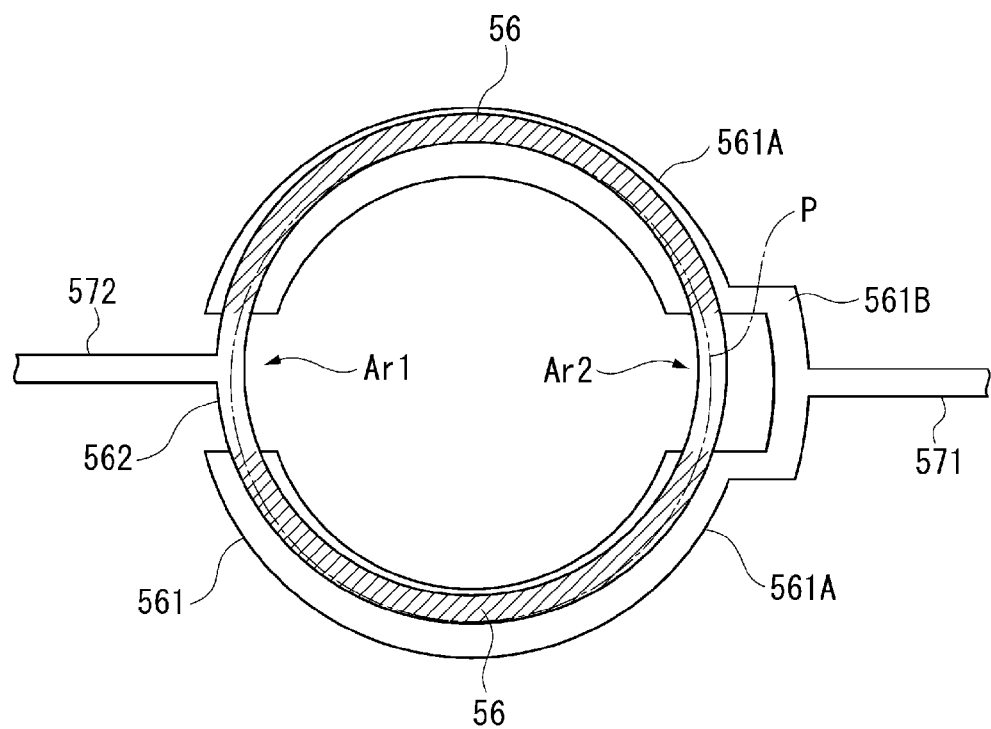
FIGS. 9A and 9B are diagrams showing the positions of the electrodes in the case in which bonding misalignment occurs in the substrate bonding process.
Figure 9B:
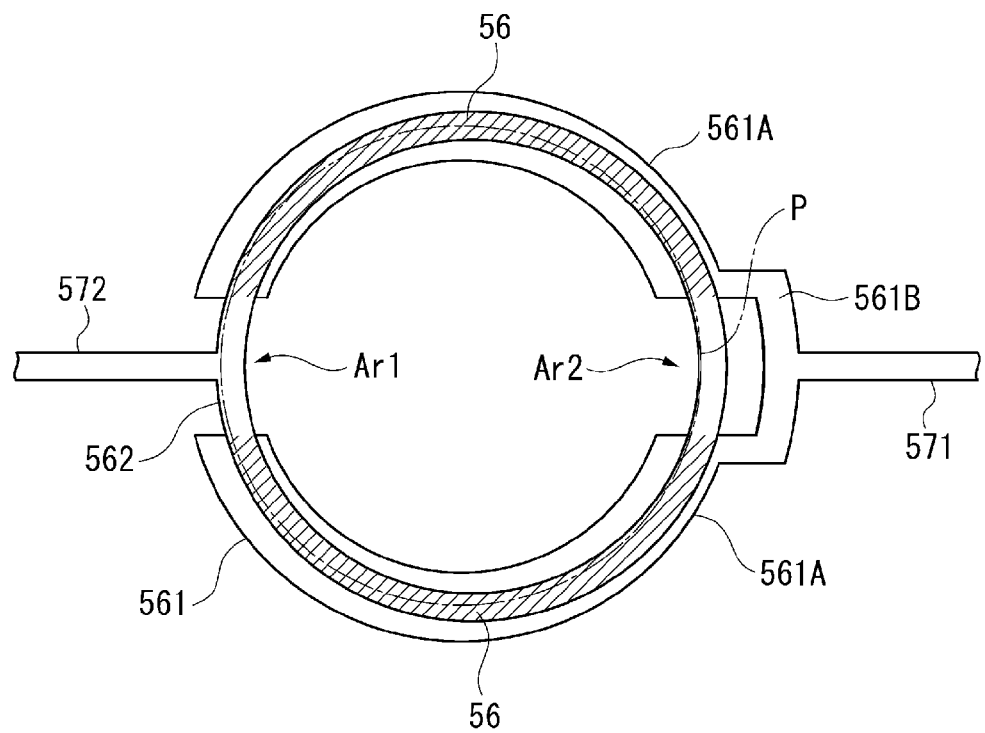

FIGS. 9A and 9B are diagrams showing the area of the electrostatic actuator 56 in the case in which bonding position of the second glass substrate M2 (the movable substrate 52) to the first glass substrate M1 (the stationary substrate 51) is shifted. FIG. 9A shows the state in which the second glass substrate M2 (the movable substrate 52) is shifted along the line connecting the vertex C2 and a vertex C4, and FIG. 9B shows the state in which the second glass substrate M2 (the movable substrate 52) is shifted along the line connecting the vertex C1 and the vertex C3.

As is understood from the comparison between FIGS. 9A and 9B, and FIG. 4, even in the case in which bonding misalignment between the first glass substrate M1 and the second glass substrate M2 occurs, according to the present embodiment, the area of the region where the stationary electrode 561 and the movable electrode 562 overlap each other does not decrease. Further, even in the case in which bonding misalignment occurs, the stationary extraction electrode 571 and the movable electrode 562 do not overlap each other, and the movable extraction electrode 572 and the stationary electrode 561 do not overlap each other in the filter plan view, and therefore, there is no chance for the area of the region functioning as the electrostatic actuator 56 to increase. In other words, the area of the region functioning as the electrostatic actuator 56 is kept roughly equal compared to the case in which no bonding misalignment occurs, and thus it is possible to keep the characteristic of the electrostatic actuator 56 constant.

Then, after bonding the first glass substrate M1 and the second glass substrate M2 to each other as described above, a cutting process of removing the variable wavelength interference filters 5 chip by chip is performed. Specifically, the bonded body of the first glass substrate M1 and the second glass substrate M2 is cut along the lines B1 shown in FIG. 8. Cutting can be performed using, for example, laser cutting. In such a manner as described above, the variable wavelength interference filter 5 can be manufactured chip by chip.

Functions and Advantages of Present Embodiment

In the present embodiment, the inner peripheral edge 561A1 of the stationary electrode 561 provided to the stationary substrate 51 is located on the side closer to the optical interference region Ar0 than the inner peripheral edge 562A1 of the movable electrode 562 provided to the movable substrate 52, and the outer peripheral edge 561A2 of the stationary electrode 561 is located on the side further from the optical interference region Ar0 than the outer peripheral edge 562A2 of the movable electrode 562.

Therefore, even in the case in which bonding misalignment occurs in the substrate bonding process S3 of bonding the stationary substrate 51 and the movable substrate 52 to each other, the area of the region where the movable electrode 562 and the stationary electrode 561 overlap each other does not decrease in the filter plan view. Therefore, it is possible to keep the characteristic of the actuator 56, and thus, the gap amount can accurately be controlled in the gap control of the inter-reflecting film gap G1.

Thus, it is possible to accurately remove the light with the desired target wavelength from the variable wavelength interference filter 5, and the optical module 10 can detect the accurate light intensity of the light with the target wavelength in the detector 11. Further, based on the light intensity thus obtained, the spectroscopic measurement device 1 can perform an accurate spectroscopic analysis.

In the present embodiment, the stationary electrode 561 is provided with two stationary partial electrodes 561A point-symmetric with each other, and the ends of these stationary partial electrodes 561A are opposed to each other across the first end-to-end region Ar1 and the second end-to-end region Ar2. Further, the movable extraction electrode 572 is connected to the movable electrode 562 in the first end-to-end region Ar1. Further, the stationary extraction electrode 571 is connected to the stationary connection electrode 561B disposed on the outer peripheral side of the stationary partial electrodes 561A, and does not overlap the movable electrode 562 and the movable extraction electrode 572.

Therefore, even in the case in which bonding misalignment between the stationary substrate 51 and the movable substrate 52 occurs, there is no chance for the movable electrode 562 and the stationary extraction electrode 571 to be opposed to each other, and thus, the area of the region functioning as the electrostatic actuator 56 does not increase. Further, as described above, there is no decrease in the area of the region where the stationary electrode 561 and the movable electrode 562 is opposed to each other. Therefore, even in the case in which bonding misalignment occurs, the area of the region functioning as the electrostatic actuator 56 is kept roughly constant, and thus, the characteristic of the electrostatic actuator can be maintained. Therefore, the degradation of the accuracy of the gap control of the inter-reflecting film gap G1 can more surely be suppressed.

In the present embodiment, the stationary partial electrodes 561A are connected to each other by the stationary connection electrode 561B, and the stationary extraction electrode 571 is connected to the stationary connection electrode 561B. Therefore, the stationary extraction electrode 571 does not need to be connected to both of the stationary partial electrodes 561A in order to set the same potential to both of the stationary partial electrodes 561A, and thus the electrode configuration can be simplified.

Second Embodiment

Next, a second embodiment of the invention will be explained with reference to the accompanying drawings.

In the first embodiment described above, there is adopted the configuration in which the stationary substrate 51 is provided with the stationary partial electrodes 561A along the imaginary circle P and the stationary connection electrode 561B. In contrast, in the second embodiment, there is exemplified a configuration in which a double electrode is disposed in the outer periphery of the optical interference region Ar0. This configuration is capable of more accurately performing the gap control of the inter-reflecting film gap G1.

Figure 10:
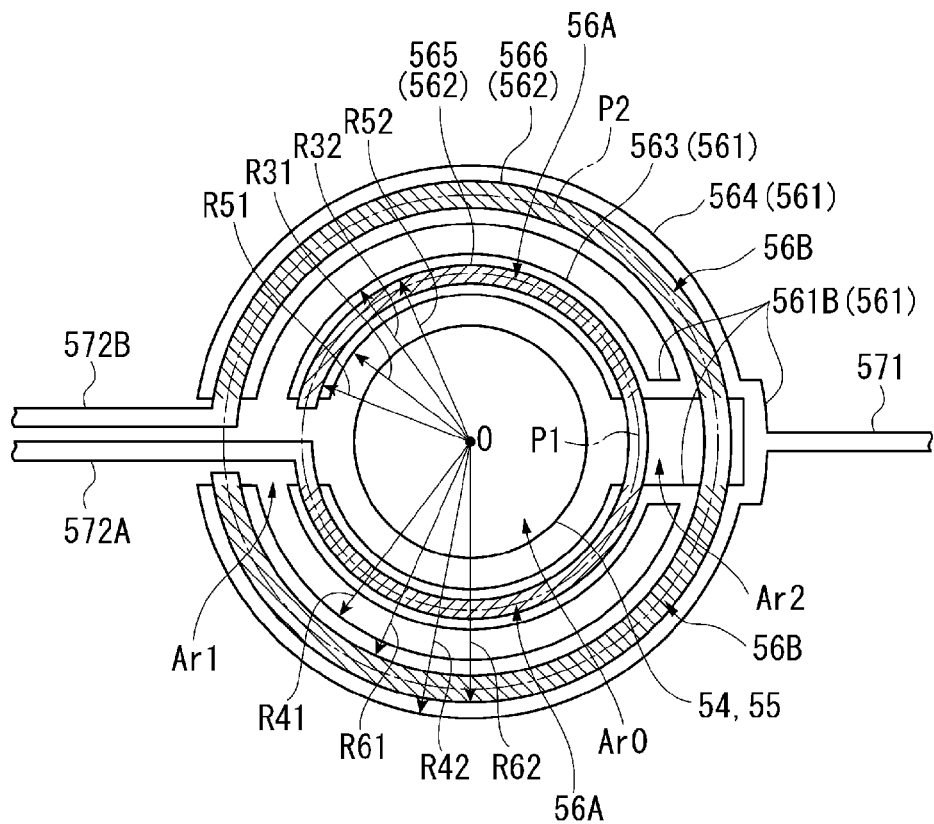
FIG. 10 is a plan view showing an electrode configuration of an electrostatic actuator of a variable wavelength interference filter according to a second embodiment.

FIG. 10 is a diagram showing an electrode configuration in the variable wavelength interference filter according to the second embodiment. It should be noted that in the following explanation, the constituents identical to those of the first embodiment will be denoted with the same reference symbols, and the explanation therefor will be omitted.

As shown in FIG. 10, in the variable wavelength interference filter according to the second embodiment, the stationary electrode 561 provided to the stationary substrate 51 is provided with two stationary inner electrodes 563, two stationary outer electrodes 564, and the stationary connection electrode 561B.

The two stationary inner electrodes 563 each have an arc shape along an imaginary circle P1 centered on the filter center point O in the filter plan view, and are disposed at respective positions point-symmetric with each other about the filter center point O. The two stationary outer electrodes 564 each have an arc shape along an imaginary circle P2 with a diameter larger than that of the imaginary circle P1 centered on the filter center point O in the filter plan view, and are disposed at respective positions point-symmetric with each other about the filter center point O.

Further, the two stationary inner electrodes 563 have respective ends opposed to each other in the first end-to-end region Ar1 and the second end-to-end region Ar2, and the two stationary outer electrodes 564 also have respective ends opposed to each other in the first end-to-end region Ar1 and the second end-to-end region Ar2.

Further, the stationary connection electrode 561B connects all of these stationary inner electrodes 563 and the stationary outer electrodes 564 to each other in the second end-to-end region Ar2. Further, the stationary extraction electrode 571 is connected to the stationary connection electrode 561B.

On the other hand, the movable electrode 562 provided to the movable substrate 52 is provided with a movable inner electrode 565 and a movable outer electrode 566.

The movable inner electrode 565 is formed to have an arc shape along the imaginary circle P1, and both of the ends of the arc are located in the first end-to-end region Ar1, and slightly project from the ends of the stationary inner electrodes 563 in the filter plan view. The dimension of the projection is sufficiently set to a value equal to or larger than the bonding accuracy (the maximum misalignment amount) when bonding the substrates to each other.

The movable outer electrode 566 is formed to have an arc shape along the imaginary circle P2, and both of the ends of the arc are located in the first end-to-end region Ar1, and slightly project from the ends of the stationary outer electrodes 564 in the filter plan view. The dimension of the projection is also sufficiently set to a value equal to or larger than the bonding accuracy (the maximum misalignment amount) when bonding the substrates to each other.

Further, a movable inner extraction electrode 572A is connected to an end of the movable inner electrode 565 in the first end-to-end region Ar1, and a movable outer extraction electrode 572B is connected to an end of the movable outer electrode 566 in the first end-to-end region Ar1. The movable inner extraction electrode 572A and the movable outer extraction electrode 572B extend to the end of the movable substrate 52 without intersecting with each other, and the respective tip portions thereof are connected to the voltage control section 15 with, for example, FPC or lead wires, similarly to the movable extraction electrode 572 in the first embodiment.

Therefore, in the variable wavelength interference filter according to the present embodiment, the region (the upward sloping line area in FIG. 10) along the imaginary circle P1 where the stationary inner electrodes 563 and the movable inner electrode 565 are opposed to each other functions as an inner electrostatic actuator 56A. Further, the region (the downward sloping line area in FIG. 10) along the imaginary circle P2 where the stationary outer electrodes 564 and the movable outer electrode 566 are opposed to each other functions as an outer electrostatic actuator 56B. Further, since the movable inner electrode 565 and the movable outer electrode 566 are disposed independently from each other, it becomes possible to apply respective voltages different from each other to these electrostatic actuators 56A, 56B. In such a configuration, it is possible to perform the control of applying a first voltage for varying the inter-reflecting film gap G1 to the vicinity of the target gap amount to, for example, the inner electrostatic actuator 56A, and then applying a second voltage for making the inter-reflecting film gap G1 accurately coincide with the target gap amount to the outer electrostatic actuator 56B. In this case, the sensitivity of the outer electrostatic actuator 56B can be reduced, and thus, more accurate gap control of the inter-reflecting film gap G1 can be performed.

Further, in the present embodiment, the stationary inner electrodes 563 are formed to have a width dimension (the dimension along the radial direction of the imaginary circle P1, corresponding to the first width dimension of the embodiment of the invention) larger than the width dimension (corresponding to the second width dimension of the embodiment of the invention) of the movable inner electrode 565, and the stationary outer electrodes 564 are formed to have a width dimension (the dimension along the radial direction of the imaginary circle P2, corresponding to the first width dimension of the embodiment of the invention) larger than the width dimension (corresponding to the second width dimension of the embodiment of the invention) of the movable outer electrode 566.

In other words, as shown in FIG. 10, a dimension R31 from the filter center point O to the inner peripheral edge of the stationary inner electrodes 563 is smaller than a dimension R51 from the filter center point O to the inner peripheral edge of the movable inner electrode 565. Further, a dimension R32 from the filter center point O to the outer peripheral edge of the stationary inner electrodes 563 is larger than a dimension R52 from the filter center point O to the outer peripheral edge of the movable inner electrode 565.

Similarly, a dimension R41 from the filter center point O to the inner peripheral edge of the stationary outer electrodes 564 is smaller than a dimension R61 from the filter center point O to the inner peripheral edge of the movable outer electrode 566. Further, a dimension R42 from the filter center point O to the outer peripheral edge of the stationary outer electrodes 564 is larger than a dimension R62 from the filter center point O to the outer peripheral edge of the movable outer electrode 566.

Therefore, similarly to the first embodiment, also in the present embodiment, even in the case in which bonding misalignment occurs when bonding the stationary substrate 51 and the movable substrate 52 to each other, the areas of the inner electrostatic actuator 56A and the outer electrostatic actuator 56B are roughly the same compared to the case in which no bonding misalignment occurs. Therefore, the characteristics of the inner electrostatic actuator 56A and the outer electrostatic actuator 56B are maintained even in the case in which bonding misalignment occurs, and thus, the accuracy degradation in the gap control of the inter-reflecting film gap G1 can be suppressed.

Third Embodiment

Next, an optical filter device according to a third embodiment of the invention will hereinafter be explained.

In the spectroscopic measurement device 1 according to the first embodiment described above, there is adopted the configuration in which the variable wavelength interference filter 5 is directly provided to the optical module 10. However, some optical modules have a complicated configuration, and there are some cases in which it is difficult to directly provide the variable wavelength interference filter 5 in particular to a small-sized optical module. In the present embodiment, an optical filter device, which makes it possible to easily install the variable wavelength interference filter 5 also to such an optical module, will hereinafter be explained.

Figure 11:
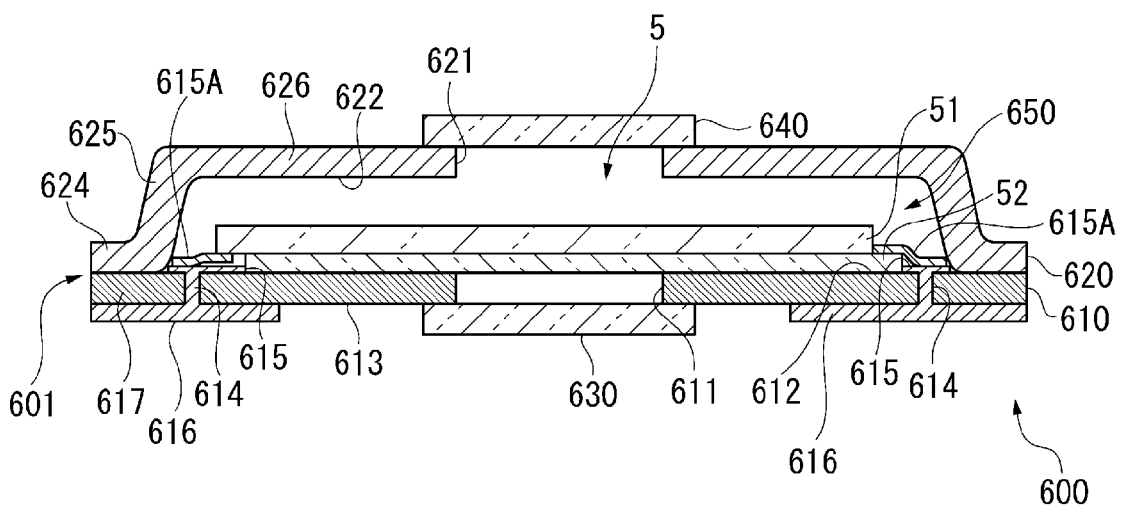
FIG. 11 is a cross-sectional view showing a schematic configuration of an optical filter device according to a third embodiment.

FIG. 11 is a cross-sectional view showing a schematic configuration of an optical filter device according to the third embodiment of the invention.

As shown in FIG. 11, an optical filter device 600 is provided with the variable wavelength interference filter 5, and a housing 601 for housing the variable wavelength interference filter 5.

The housing 601 is provided with a base substrate 610, a lid 620, a base-side glass substrate 630, and a lid-side glass substrate 640.

The base substrate 610 is formed of, for example, a single layer ceramic substrate. The movable substrate 52 of the variable wavelength interference filter 5 is installed to the base substrate 610. As a method of installation of the movable substrate 52 to the base substrate 610, it is possible to adopt a method of disposing it via, for example, an adhesive, or a method of disposing it by fitting it to, for example, another fixation member. Further, the base substrate 610 is provided with a light passage hole 611 opening in an area opposed to the reflecting films 54, 55. Further, the base-side glass substrate 630 is bonded so as to cover the light passage hole 611. As the bonding method of the base-side glass substrate 630, for example, glass frit bonding using a glass frit, which is a scrap of glass obtained by melting a glass material at high temperature and then rapidly cooling it, and bonding with epoxy resin or the like can be used.

The base inner surface 612 opposed to the lid 620 of the base substrate 610 is provided with inner terminal sections 615 corresponding respectively to the extraction electrodes 571, 572 of the variable wavelength interference filter 5. It should be noted that the connection between the extraction electrodes 571, 572 and the respective inner terminal sections 615 can be achieved using, for example, FPC 615A, and bonding therebetween is achieved using, for example, Ag paste, an anisotropic conductive film (ACF), and anisotropic conductive paste (ACP). It should be noted that the Ag paste with little outgassing is preferably used for keeping the internal space 650 in the vacuum state. Further, wiring connection with, for example, wire bonding can also be performed besides the connection using the FPC 615A.

Further, the base substrate 610 is provided with through holes 614 formed so as to correspond to the positions where the respective inner terminal sections 615 are disposed, and the inner terminal sections 615 are connected to outer terminal sections 616 disposed on a base outer surface 613 of the base substrate 610 on the opposite side to the base inner surface 612 via electrically conductive members with which the through holes 614 are filled, respectively.

Further, the outer peripheral portion of the base substrate 610 is provided with a base bonding section 617 to be bonded to the lid 620.

As shown in FIG. 11, the lid 620 is provided with a lid bonding section 624 to be bonded to the base bonding section 617 of the base substrate 610, a sidewall section 625 continuing from the lid bonding section 624 and rising in the direction of departing from the base substrate 610, and a top surface section 626 continuing from the sidewall section 625 and covering the stationary substrate 51 side of the variable wavelength interference filter 5. The lid 620 can be formed of an alloy such as kovar, or metal.

The lid 620 is adhesively bonded to the base substrate 610 by the lid bonding section 624 and the base bonding section 617 of the base substrate 610 bonded to each other.

As the bonding method, there can be cited, for example, soldering with brazing silver or the like, sealing with a eutectic alloy layer, welding with low-melting-point glass, glass adhesion, glass frit bonding, and adhesion with epoxy resin, besides laser welding. These bonding methods can arbitrarily be selected in accordance with the materials of the base substrate 610 and the lid 620, the bonding environment, and so on.

The top surface section 626 of the lid 620 is set to be parallel to the base substrate 610. The top surface section 626 is provided with a light passage hole 621 opening in an area opposed to the reflecting films 54, of the variable wavelength interference filter 5. Further, the lid-side glass substrate 640 is bonded so as to cover the light passage hole 621. As the bonding method of the lid-side glass substrate 640, the glass frit bonding, adhesion with epoxy resin, and so on can be used similarly to the bonding of the base-side glass substrate 630.

Functions and Advantages of Third Embodiment

In the optical filter device 600 according to the present embodiment, since the variable wavelength interference filter 5 is protected by the housing 601, the characteristic change of the variable wavelength interference filter 5 due to foreign matters, gases and so on included in the atmosphere can be prevented, and further, breakage of the variable wavelength interference filter 5 due to external factors can be prevented. Further, since invasion of charged particles can be prevented, charging of the stationary reflecting film 54, the movable reflecting film 55, the stationary electrode 561, and the movable electrode 562 can be prevented. Therefore, generation of a coulomb force due to charging can be suppressed, and thus, parallelism between the stationary reflecting film 54 and the movable reflecting film 55 can more surely be maintained.

Further, in the case of, for example, carrying the variable wavelength interference filter 5 manufactured in a factory to an assembly line for assembling the optical modules or the electronic apparatuses, it becomes possible to safely carry the variable wavelength interference filter 5 protected as the optical filter device 600.

Further, since the optical filter device 600 is provided with outer terminal section 616 exposed on the outer peripheral surface of the housing 601, it becomes possible to easily provide wiring when installing it to the optical module or the electronic apparatus.

Other Embodiments

It should be noted that the invention is not limited to the embodiments described above and includes modifications, improvements, and so on within a range where the advantages of the invention can be achieved.

FIGS. 12, 13, 14, and 15 are diagrams each showing an example of the electrode configuration of the variable wavelength interference filter according to other embodiments.

Figure 12:
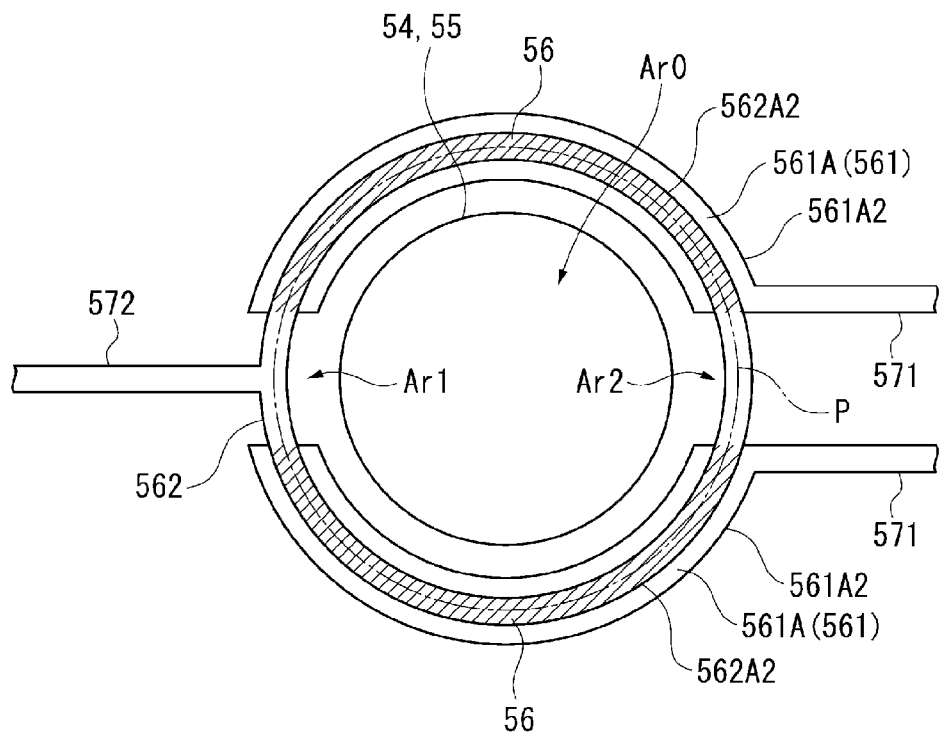
FIG. 12 is a plan view showing an electrode configuration of an electrostatic actuator of a variable wavelength interference filter according to another embodiment.

Although in the first embodiment described above, the example in which the two stationary partial electrodes 561A are connected by the stationary connection electrode 561B is described, it is also possible to adopt a configuration in which the stationary extraction electrodes 571 are respectively connected to the two stationary partial electrodes 561A without providing the stationary connection electrode 561B as shown in, for example, FIG. 12. Also in this case, since the outer peripheral edge 561A2 of each of the stationary partial electrodes 561A is disposed outside the outer peripheral edge 562A2 of the movable electrode 562 in the radial direction, there is no chance for the stationary extraction electrodes 571 and the movable electrode 562 to overlap each other.

Figure 13:
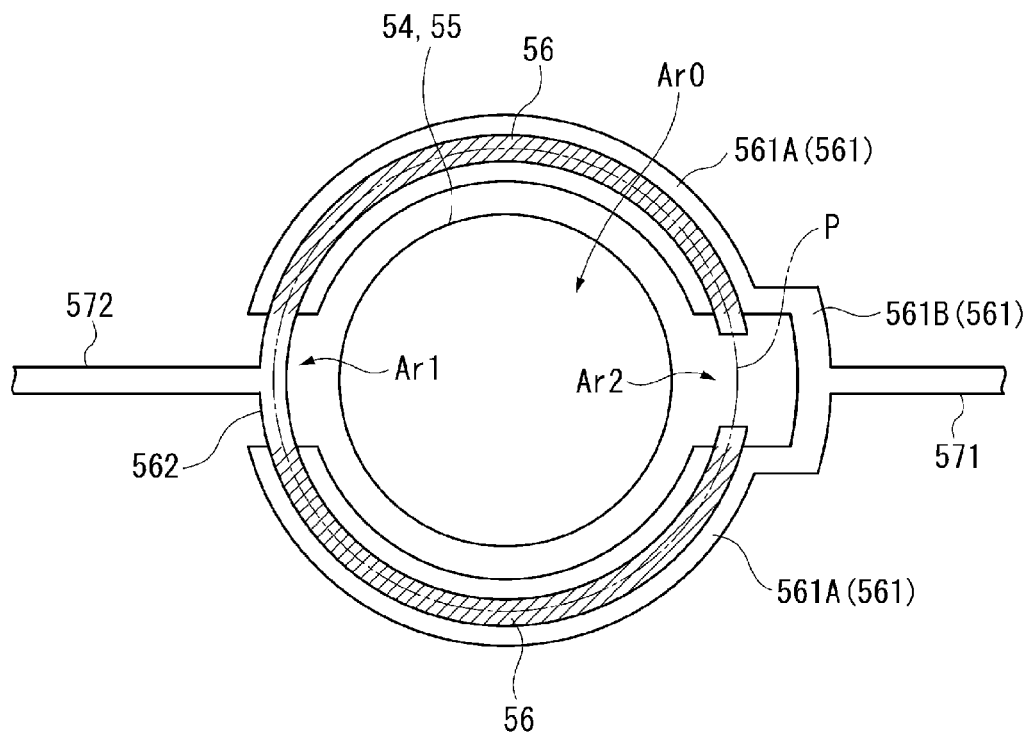
FIG. 13 is a plan view showing an electrode configuration of an electrostatic actuator of a variable wavelength interference filter according to another embodiment.

Further, although in the first embodiment there is described the example in which the movable electrode 562 is formed to have the annular shape, it is also possible to adopt a roughly C shape having an opening in the area corresponding to the second end-to-end region Ar2 as the electrode shape of the movable electrode 562 as shown in FIG. 13. In this case, it is preferable to make the ends of the movable electrode 562 project from the ends of the stationary partial electrodes 561A in the opening of the C shape as much as a length equal to or larger than the maximum misalignment amount when bonding as shown in FIG. 13.

Figure 14:
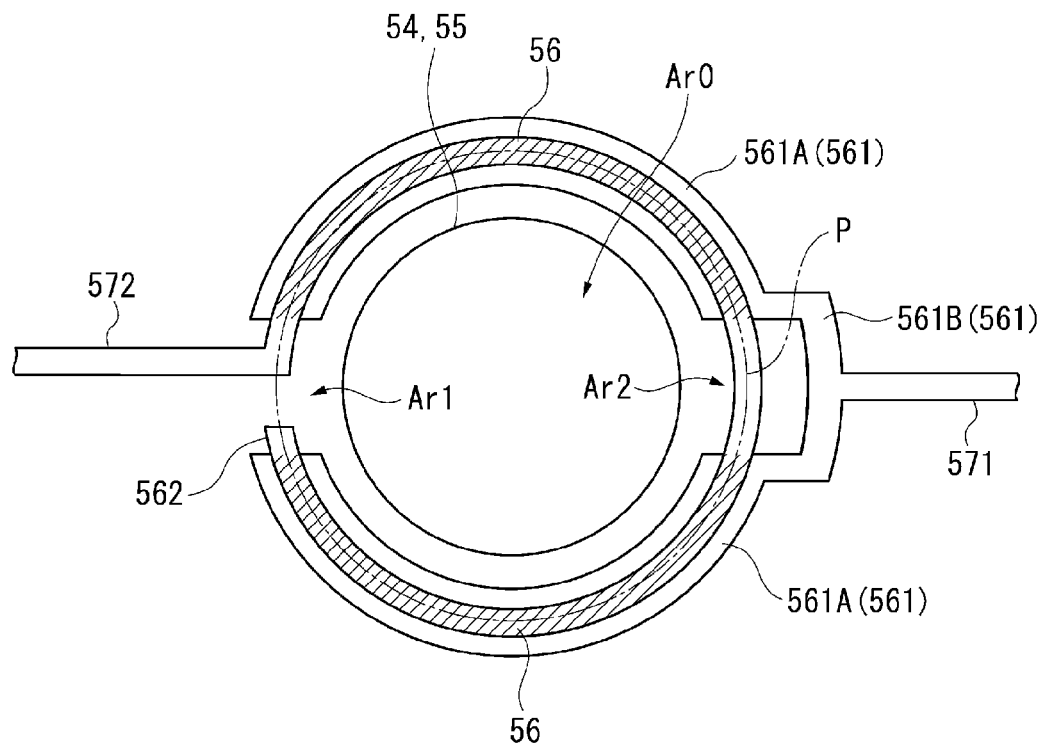
FIG. 14 is a plan view showing an electrode configuration of an electrostatic actuator of a variable wavelength interference filter according to another embodiment.

It should be noted that it is also possible to adopt a configuration in which the movable electrode 562 is formed to have a C shape having an opening in the first end-to-end region Ar1 as shown in FIG. 14. Also in this case, since the movable extraction electrode 572 is connected to the movable electrode 562 in the first end-to-end region Ar1, the problem that the movable extraction electrode 572 and the stationary electrode 561 are opposed to each other can be avoided even in the case in which bonding misalignment occurs.

Figure 15:
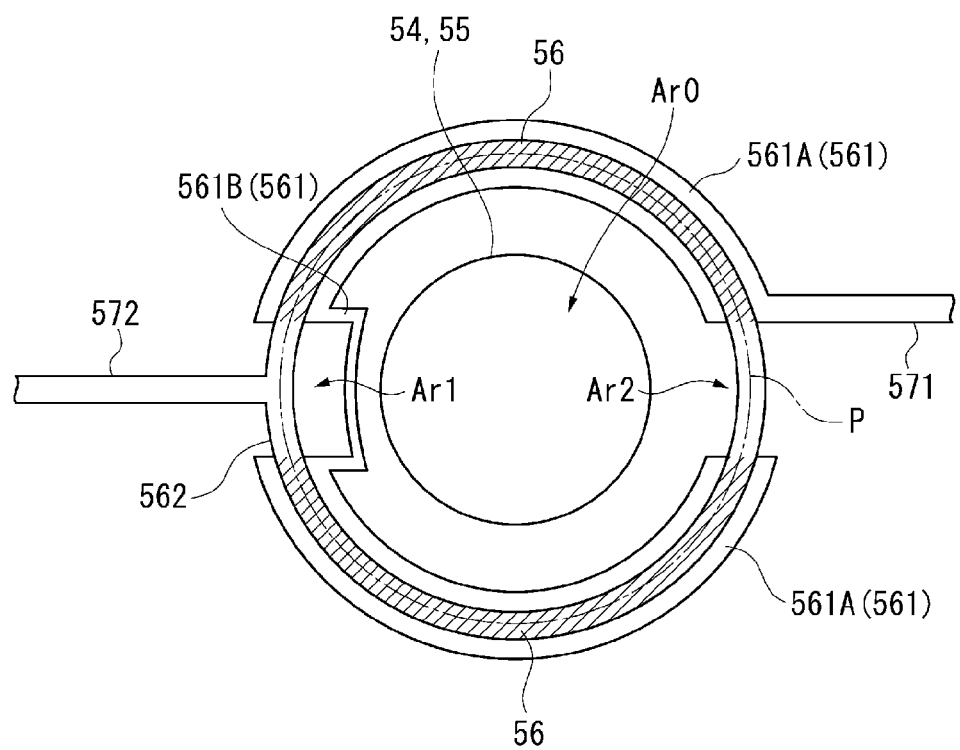
FIG. 15 is a plan view showing an electrode configuration of an electrostatic actuator of a variable wavelength interference filter according to another embodiment.

Further, although in the first embodiment and the second embodiment, there is adopted the configuration in which the stationary connection electrode 561B is disposed in the second end-to-end region Ar2, the invention is not limited thereto. For example, it is also possible to adopt a configuration in which the stationary connection electrode 561B is disposed in the first end-to-end region Ar1 as shown in FIG. 15. In this case, in order to avoid the overlap between the stationary connection electrode 561B and the movable extraction electrode 572 in the filter plan view, it is preferable to dispose the stationary connection electrode 561B on the filter center point O side of the inner peripheral edge 561A1 of each of the stationary partial electrodes 561A. It should be noted that in this case, since the forming area of the stationary reflecting film 54 with respect to the overall size of the variable wavelength interference filter 5 can be reduced, it is preferable that the stationary connection electrode 561B is disposed in the second end-to-end region Ar2 where the movable extraction electrode 572 is not disposed as in the case of the first embodiment.

Further, although in each of the embodiments described above it is assumed that the first substrate of the embodiment of the invention corresponds to the stationary substrate 51, the first electrode corresponds to the stationary electrode 561, the second substrate corresponds to the movable substrate 52, and the second electrode corresponds to the movable electrode 562, the invention is not limited thereto. For example, it is also possible to assume that the first substrate corresponds to the movable substrate, the first electrode corresponds to the movable electrode, the second substrate corresponds to the stationary substrate, and the second electrode corresponds to the stationary electrode. Preferably, the electrode shapes are set so that the length from the filter center point O to the inner peripheral edge of the movable electrode is smaller than the length from the filter center point O to the inner peripheral edge of each of the stationary partial electrodes, and the length from the filter center point O to the outer peripheral edge of the movable electrode is larger than the length from the filter center point O to the outer peripheral edge of each of the stationary partial electrodes.

Further, although in the first embodiment, there is adopted the configuration in which the stationary electrode 561 is provided with the two stationary partial electrodes 561A along the imaginary circle P, it is possible to adopt a configuration in which the stationary electrode 561 is provided with three or more stationary partial electrodes 561A having the same shape and arranged at regular angular intervals with respect to the filter center point O in the filter plan view. In this case, it is possible to provide a connection section between the movable electrode 562 and the movable extraction electrode 572 so as to be opposed to an end-to-end region of the stationary partial electrodes 561A adjacent to each other. The same can be applied to the second embodiment, and it is also possible to provide three or more stationary inner electrodes 563 and three or more stationary outer electrodes 564.

Further, although the stationary partial electrodes 561A and the movable electrode 562 having the arc shape along the imaginary circles P are exemplified, the invention is not limited thereto. For example, it is also possible to adopt a configuration in which the stationary partial electrodes 561A and the movable electrode 562 are disposed along imaginary lines having a rectangular shape centered on the filter center point O.

Further, although the spectroscopic measurement device 1 is cited in each of the embodiments described above as an example of the electronic apparatus according to the invention, the drive method of the variable wavelength interference filter, the optical module, and the electronic apparatus according to the invention can be applied in a variety of fields besides the above.

Figure 16:
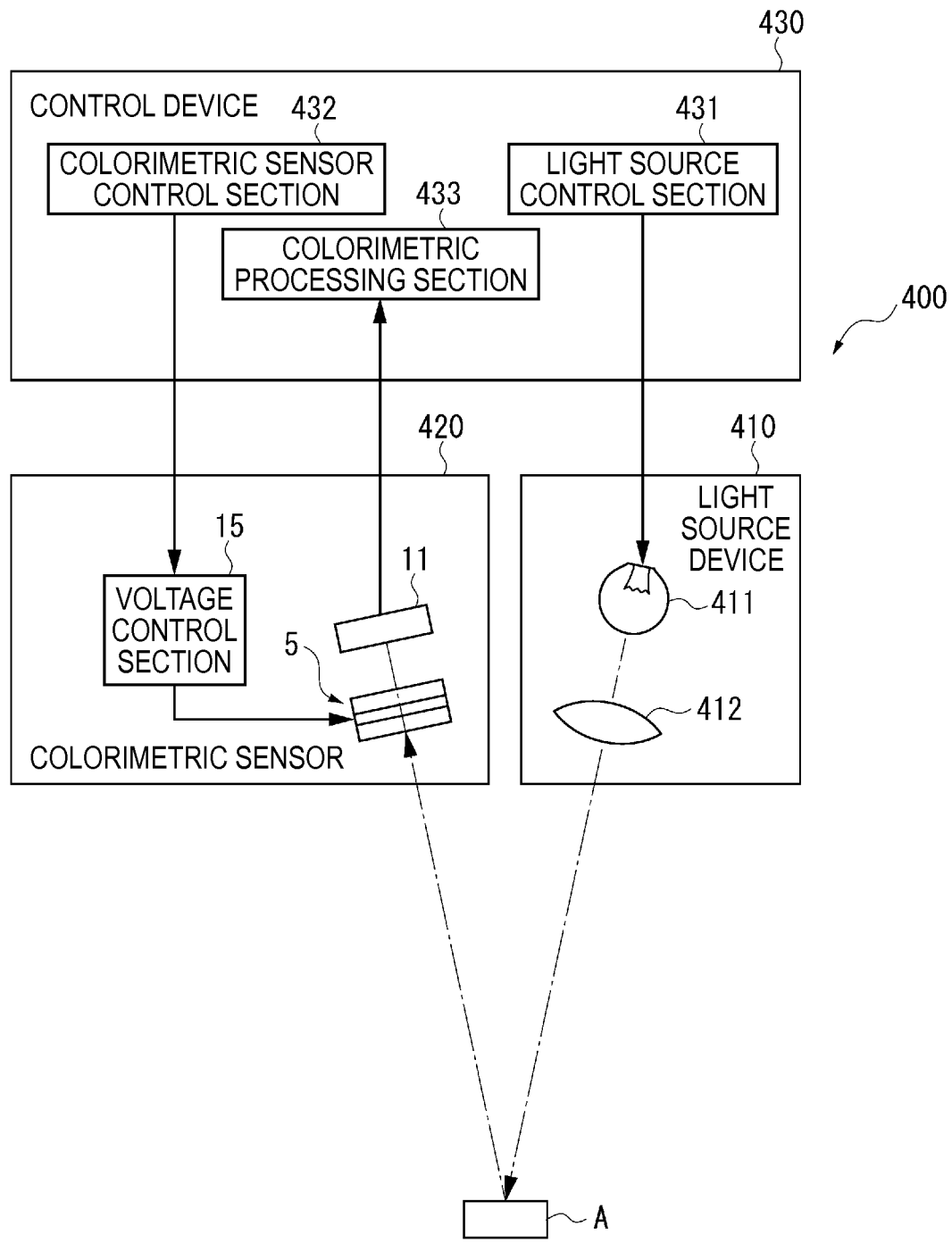
FIG. 16 is a schematic view showing a colorimetric device as an example of an electronic apparatus according to the invention.

For example, as shown in FIG. 16, it is also possible to apply the electronic apparatus according to the embodiment of the invention to a colorimetric device for measuring colors.

FIG. 16 is a block diagram showing an example of a colorimetric device 400 equipped with the variable wavelength interference filter.

As shown in FIG. 16, the colorimetric device 400 is provided with a light source device 410 for emitting light to a test object A, a colorimetric sensor 420 (an optical module), and a control device 430 for controlling an overall operation of the colorimetric device 400. Further, the colorimetric device 400 is a device for making the light, which is emitted from the light source device 410, be reflected by the test object A, receiving the test target light thus reflected using the colorimetric sensor 420, and analyzing and then measuring the chromaticity of the test target light, namely the color of the test object A, based on a detection signal output from the colorimetric sensor 420.

The light source device 410 is provided with a light source 411 and a plurality of lenses 412 (one of the lenses is shown alone in FIG. 16), and emits, for example, reference light (e.g., white light) to the test object A. Further, it is possible for the plurality of lenses 412 to include a collimator lens, and in this case, the light source device 410 converts the reference light emitted from the light source 411 into parallel light with the collimator lens, and then emits it from the projection lens not shown toward the test object A. It should be noted that although in the present embodiment the colorimetric device 400 provided with the light source device 410 is described as an example, in the case in which, for example, the test object A is a light emitting member such as a liquid crystal panel, it is also possible to adopt a configuration not provided with the light source device 400.

As shown in FIG. 16, the colorimetric sensor 420 is provided with the variable wavelength interference filter 5, the detector 11 for receiving the light transmitted through the variable wavelength interference filter 5, and the voltage control section 15 for varying the wavelength of the light to be transmitted through the variable wavelength interference filter 5. Further, the colorimetric sensor 420 is provided with an entrance optical lens not shown disposed at a position opposed to the variable wavelength interference filter 5, the entrance optical lens guiding the reflected light (the test target light), which has been reflected by the test object A, into the inside thereof. Further, the colorimetric sensor 420 disperses the light with a predetermined wavelength out of the test target light input from the entrance optical lens using the variable wavelength interference filter 5, and then receives the light thus dispersed using the detector 11. It should be noted that it is also possible to use the variable wavelength interference filter having the electrode configuration shown in the second embodiment or FIGS. 12 through 15 instead of the variable wavelength interference filter 5, or it is possible to provide the optical filter device 600 according to the third embodiment.

The control device 430 controls an overall function of the colorimetric device 400.

As the control device 430, a general-purpose personal computer, a handheld terminal, a colorimetry-dedicated computer, and so on can be used. Further, as shown in FIG. 16, the control device 430 is configured including a light source control section 431, a colorimetric sensor control section 432, a colorimetric processing section 433, and so on.

Further, the light source control section 431 is connected to the light source device 410, and outputs a predetermined control signal to the light source device 410 based on, for example, a setting input by the user to thereby make the light source device 410 emit white light with a predetermined brightness.

The colorimetric sensor control section 432 is connected to the colorimetric sensor 420, and sets the wavelength of the light to be received by the colorimetric sensor 420 based on, for example, the setting input by the user, and then outputs the control signal instructing to detect the intensity of the received light with this wavelength to the colorimetric sensor 420. Thus, the voltage control section 15 of the colorimetric sensor 420 applies the voltage to the electrostatic actuator 56 based on the control signal to thereby drive the variable wavelength interference filter 5.

The colorimetric processing section 433 analyzes the chromaticity of the test object A based on the light reception intensity detected by the detector 11.

Further, as another example of the electronic apparatus according to the invention, there can be cited an optical-base system for detecting presence of a specific material. As such a system, there can be exemplified, for example, an in-car gas leak detector adopting a spectroscopic measurement method using the variable wavelength interference filter according to the embodiment of the invention and detecting a specific gas with high sensitivity, and a gas detection device such as an optoacoustic noble-gas detector for breath-testing.

An example of such a gas detection device will hereinafter be explained with reference to the accompanying drawings.

Figure 17:
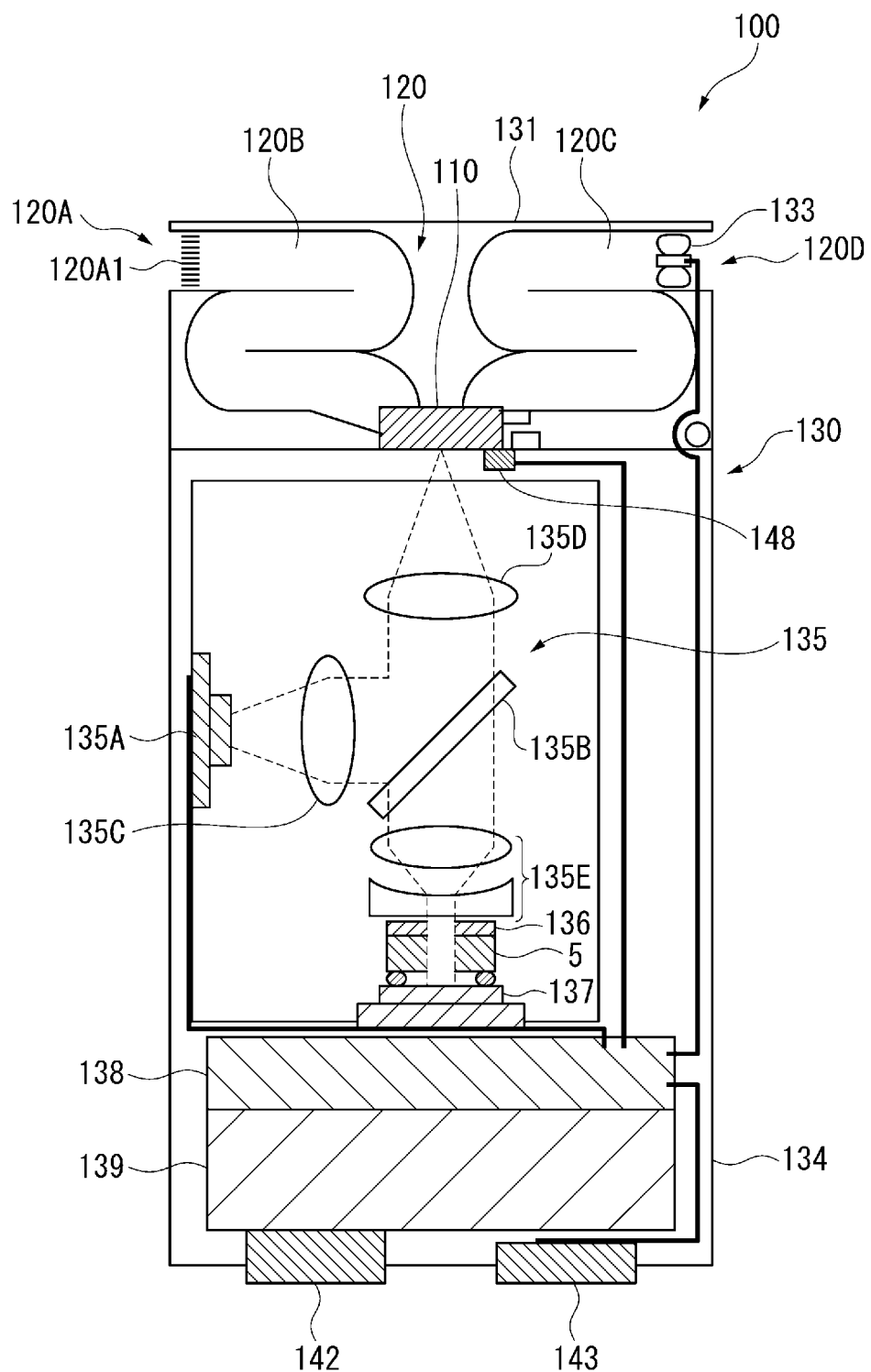
FIG. 17 is a schematic view showing a gas detection device as an example of the electronic apparatus according to the invention.

FIG. 17 is a schematic diagram showing an example of a gas detection device provided with the variable wavelength interference filter.

Figure 18:
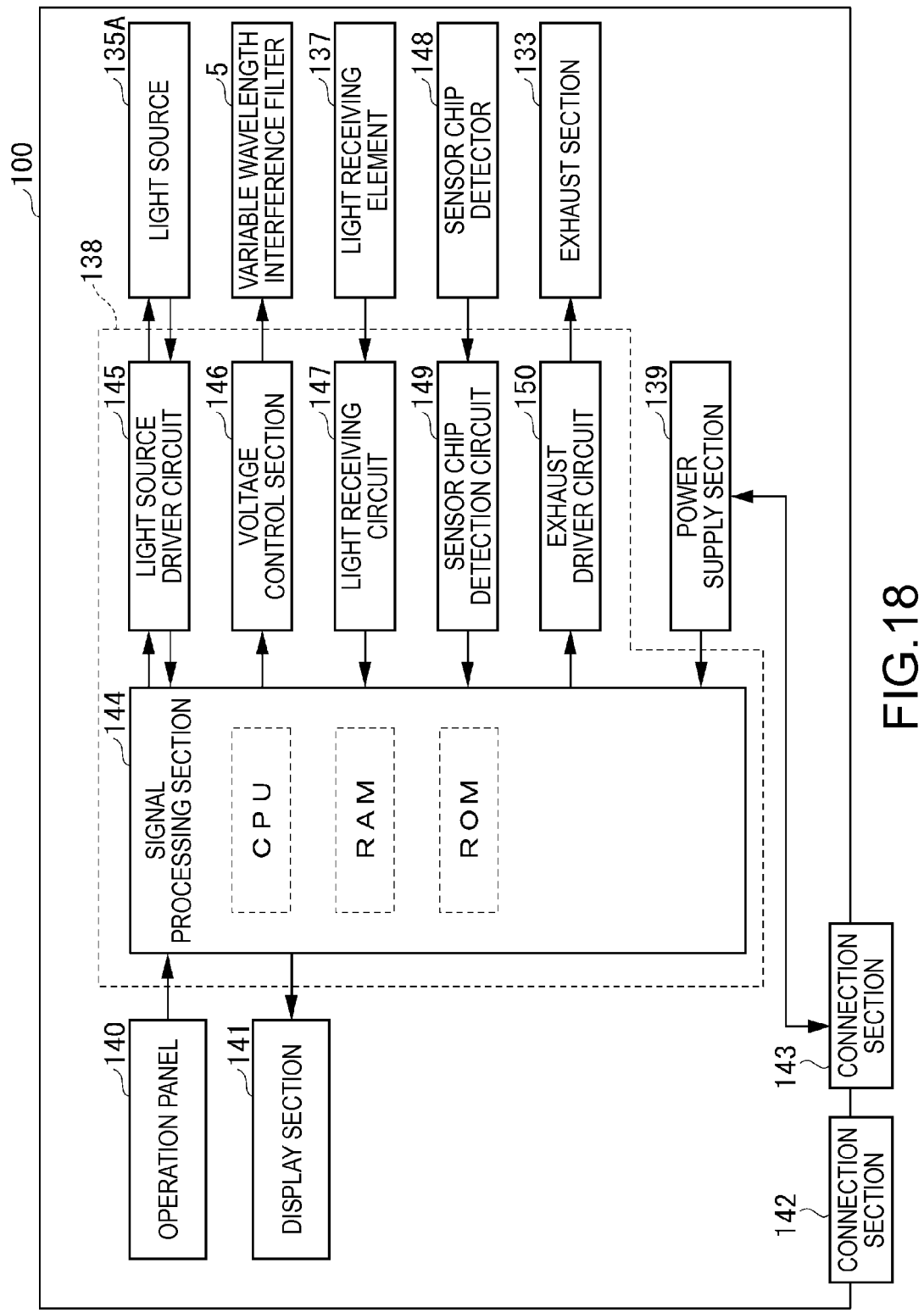
FIG. 18 is a block diagram showing a configuration of a control system of the gas detection device shown in FIG. 17.

FIG. 18 is a block diagram showing a configuration of a control system of the gas detection device shown in FIG. 17.

As shown in FIG. 17, a gas detection device 100 is configured including a sensor chip 110, a channel 120 provided with a suction port 120A, a suction channel 120B, an exhaust channel 120C, and an exhaust port 120D, and a main body section 130.

The main body section 130 is composed of a detection device (an optical module) including a sensor section cover 131 having an opening to which the channel 120 is detachably attached, an exhaust section 133, a housing 134, an optical section 135, a filter 136, the variable wavelength interference filter 5, a light receiving element 137 (a detection section), and so on, a control section 138 (a processing section) for processing the signal thus detected and controlling the detection section, a power supply section 139 for supplying electrical power, and so on. It should be noted that it is also possible to use the variable wavelength interference filter having the electrode configuration shown in the second embodiment or FIGS. 12 through 15 instead of the variable wavelength interference filter 5, or it is possible to provide the optical filter device 600 according to the third embodiment.

Further, the optical section 135 is composed of a light source 135A for emitting light, a beam splitter 135B for reflecting the light, which is input from the light source 135A, toward the sensor chip 110, and transmitting the light, which is input from the sensor chip side, toward the light receiving element 137, and lenses 135C, 135D, and 135E.

Further, as shown in FIG. 18, on the surface of the gas detection device 100, there are disposed an operation panel 140, a display section 141, a connection section 142 for an interface with the outside, and the power supply section 139. In the case in which the power supply section 139 is a secondary cell, a connection section 143 for the battery charge can also be provided.

Further, as shown in FIG. 18, the control section 138 of the gas detection device 100 is provided with a signal processing section 144 composed of a CPU and so on, a light source driver circuit 145 for controlling the light source 135A, a voltage control section 146 for controlling the variable wavelength interference filter 5, a light receiving circuit 147 for receiving the signal from the light receiving element 137, a sensor chip detection circuit 149 for receiving the signal from a sensor chip detector 148 for reading a code of the sensor chip 110 to thereby detect presence or absence of the sensor chip 110, an exhaust driver circuit 150 for controlling the exhaust section 133, and so on.

Next, an operation of the gas detection device 100 described above will hereinafter be explained.

The sensor chip detector 148 is disposed inside the sensor section cover 131 in the upper part of the main body section 130, and the sensor chip detector 148 detects the presence or absence of the sensor chip 110. When detecting the detection signal from the sensor chip detector 148, the signal processing section 144 determines that it is the condition in which the sensor chip 110 is attached, and outputs a display signal for displaying the fact that the detection operation can be performed to the display section 141.

Then, if, for example, the user operates the operation panel 140, and the operation panel 140 outputs an instruction signal indicating that the detection process will be started to the signal processing section 144, the signal processing section 144 firstly outputs the signal for operating the light source to the light source driver circuit 145 to thereby operate the light source 135A. When the light source 135A is driven, the light source 135A emits a stable laser beam, which has a single wavelength and is a linearly polarized light. Further, the light source 135A incorporates a temperature sensor and a light intensity sensor, and the information thereof is output to the signal processing section 144. Then, if the signal processing section 144 determines that the light source 135A is operating stably based on the information of the temperature and the light intensity input from the light source 135A, the signal processing section 144 controls the exhaust driver circuit 150 to operate the exhaust section 133. Thus, the gaseous sample including the target material (the gas molecule) to be detected is guided from the suction port 120A to the suction channel 120B, the inside of the sensor chip 110, the exhaust channel 120C, and the exhaust port 120D. It should be noted that the suction port 120A is provided with a dust filter 120A1, and relatively large dust, some water vapor, and so on are removed.

Further, the sensor chip 110 is a sensor incorporating a plurality of sets of metal nano-structures, and using localized surface plasmon resonance. In such a sensor chip 110, an enhanced electric field is formed between the metal nano-structures due to the laser beam, and when the gas molecules enter the enhanced electric field, the Raman scattered light including the information of the molecular vibration, and the Rayleigh scattered light are generated.

The Rayleigh scattered light and the Raman scattered light pass through the optical section 135 and then enter the filter 136, and the Rayleigh scattered light is separated out by the filter 136, and the Raman scattered light enters the variable wavelength interference filter 5. Then, the signal processing section 144 outputs a control signal to the voltage control section 146. Thus, the voltage control section 146 drives the variable wavelength interference filter 5 to make the variable wavelength interference filter 5 disperse the Raman scattered light corresponding to the gas molecules to be the detection target. Subsequently, if the light thus dispersed is received by the light receiving element 137, the light reception signal corresponding to the received light intensity is output to the signal processing section 144 via the light receiving circuit 147. As such, the target Raman scattered light can accurately be taken out from the variable wavelength interference filter 5.

The signal processing section 144 compares the spectrum data of the Raman scattered light corresponding to the gas molecule to be the detection target obtained in such a manner as described above and the data stored in the ROM with each other to thereby determine whether or not the gas molecule is the target one, and thus the substance is identified. Further, the signal processing section 144 makes the display section 141 display the result information, or outputs the result information from the connection section 142 to the outside.

It should be noted that although in FIGS. 17 and 18 there is exemplified the gas detection device 100 for dispersing the Raman scattered light with the variable wavelength interference filter 5, and performing the gas detection based on the Raman scattered light thus dispersed, a gas detection device for identifying the gas type by detecting the absorbance unique to the gas can also be used. In this case, the gas sensor, which makes the gas flow into the sensor, and detects the light absorbed by the gas out of the incident light, is used as the optical module according to the embodiment of the invention. Further, the gas detection device for analyzing and determining the gas flowing into the sensor using such a gas sensor is cited as the electronic apparatus according to the embodiment of the invention. According also to such a configuration, it is possible to detect the component of the gas using the variable wavelength interference filter.

Further, as the system for detecting the presence of the specific substance, besides the gas detection described above, there can be cited a substance component analysis device such as a non-invasive measurement device of a sugar group using near-infrared dispersion, or a non-invasive measurement device of information of food, biological object, or mineral.

Hereinafter, as an example of the substance component analysis device described above, a food analysis device will be explained.

Figure 19:
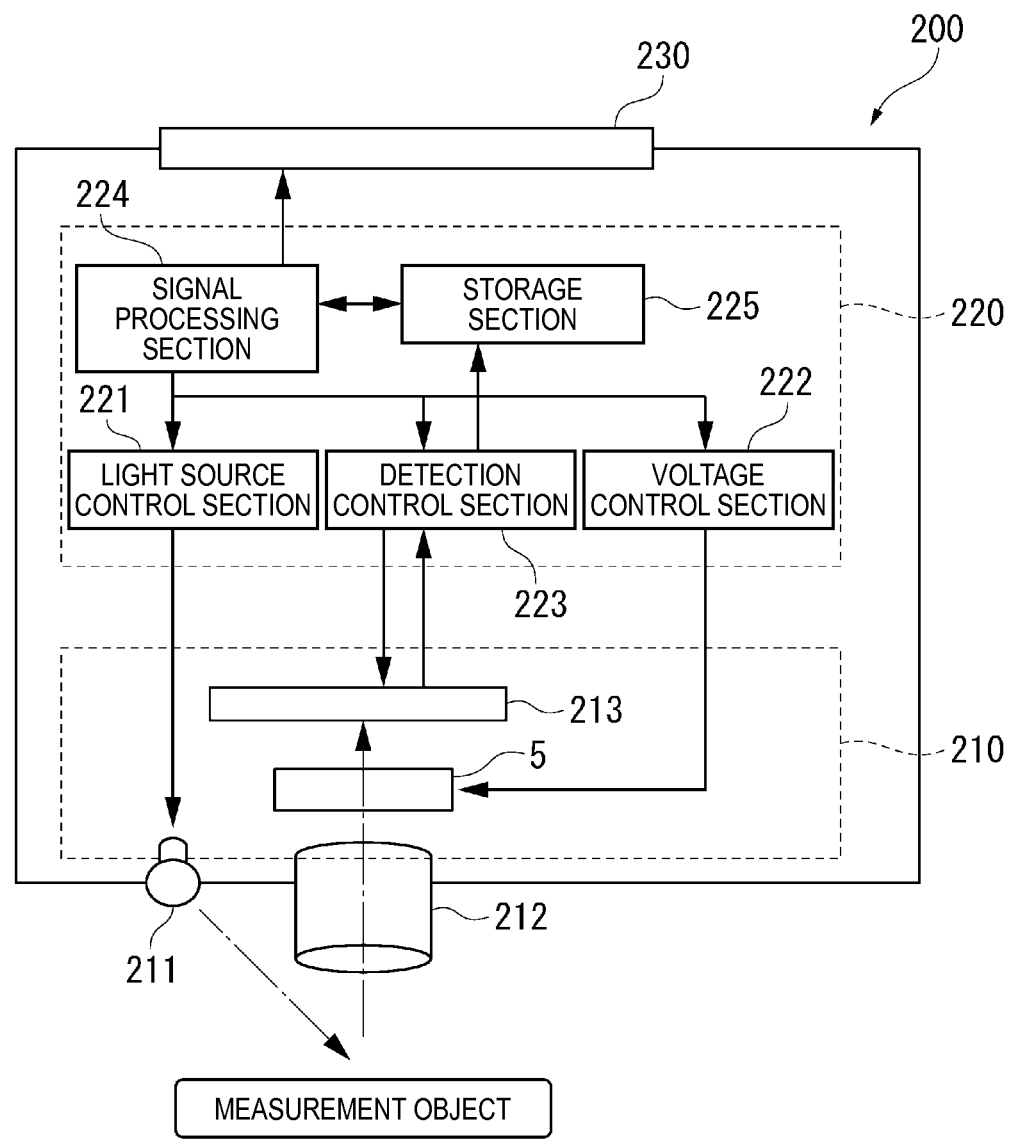
FIG. 19 is a diagram showing a schematic configuration of a food analysis device as an example of the electronic apparatus according to the invention.

FIG. 19 is a diagram showing a schematic configuration of the food analysis device as an example of the electronic apparatus using the variable wavelength interference filter 5.

As shown in FIG. 19, the food analysis device 200 is provided with a detector 210 (the optical module), a control section 220, and a display section 230. The detector 210 is provided with a light source 211 for emitting light, an image pickup lens 212 to which the light from a measurement object is introduced, the variable wavelength interference filter 5 for dispersing the light thus introduced from the image pickup lens 212, and an image pickup section 213 (a detection section) for detecting the light thus dispersed. It should be noted that it is also possible to use the variable wavelength interference filter having the electrode configuration shown in the second embodiment or FIGS. 12 through 15 instead of the variable wavelength interference filter 5, or it is possible to provide the optical filter device 600 according to the third embodiment.

Further, the control section 220 is provided with a light source control section 221 for performing lighting/extinction control of the light source 211 and brightness control in the lighting state, a voltage control section 222 for controlling the variable wavelength interference filter 5, a detection control section 223 for controlling the image pickup section 213 and obtaining a spectral image taken by the image pickup section 213, a signal processing section 224, and a storage section 225.

In the food analysis device 200, when the system is started up, the light source control section 221 controls the light source 211, and the light source 211 irradiates the measurement object with the light. Then, the light reflected by the measurement object passes through the image pickup lens 212 and then enters the variable wavelength interference filter 5. The variable wavelength interference filter 5 is driven under the control by the voltage control section 222. Thus, the light with the target wavelength can accurately be taken out from the variable wavelength interference filter 5. Then, the light thus taken out is taken by the image pickup section 213 formed of, for example, a CCD camera. Further, the light thus taken is stored in the storage section 225 as the spectral image. Further, the signal processing section 224 controls the voltage control section 222 to vary the voltage value to be applied to the variable wavelength interference filter 5 to thereby obtain the spectral image corresponding to each wavelength.

Then, the signal processing section 224 performs an arithmetic process on the data of each pixel in each of the images stored in the storage section 225 to thereby obtain the spectrum in each pixel. Further, the storage section 225 stores, for example, information related to a component of food corresponding to the spectrum, and the signal processing section 224 analyzes the data of the spectrum thus obtained based on the information related to the food stored in the storage section 225, and then obtains the food component and the content thereof included in the detection object. Further, the calorie of the food, the freshness thereof, and so on can also be calculated based on the food components and the contents thus obtained. Further, by analyzing the spectral distribution in the image, it is possible to perform extraction of the portion with low freshness in the food as a test object, and further, it is also possible to perform detection of a foreign matter included in the food.

Then, the signal processing section 224 performs a process of making the display section 230 display the information of the components, the contents, the calorie, the freshness, and so on of the food as the test object obtained in such a manner as described above.

Further, although the example of the food analysis device 200 is shown in FIG. 19, it is also possible to use substantially the same configuration as the non-invasive measurement device of other information as described above. For example, it can be used as a biological analysis device for performing analysis of a biological component such as measurement and analysis of a biological fluid such as blood. If a device of detecting ethyl alcohol is provided as a device of measuring the biological fluid component such as blood as an example of such a biological analysis device, the device can be used as a device for detecting the influence of alcohol to the driver to thereby prevent driving under the influence of alcohol. Further, it can also be used as an electronic endoscopic system equipped with such a biological analysis device.

Further, it can also be used as a mineral analysis device for performing component analysis of minerals.

Further, the variable wavelength interference filter, the optical module, and the electronic apparatus according to the embodiment of the invention can be applied to the following devices.

For example, it is also possible to transmit data with the light having each of the wavelengths by temporally varying the intensity of the light having each of the wavelengths, and in this case, it is possible to extract the data transmitted with the light having a specific wavelength by dispersing the light having the specific wavelength using the variable wavelength interference filter provided to the optical module, and then making the light receiving section receive the light. Therefore, by processing the data of the light having each of the wavelengths using the electronic apparatus equipped with such a data extracting optical module, it is also possible to perform optical communication.

Further, the electronic apparatus can be applied to a spectroscopic camera for picking up the spectral image and a spectroscopic analysis device by dispersing the light with the variable wavelength interference filter according to the embodiment of the invention. As an example of such a spectroscopic camera, an infrared camera incorporating the variable wavelength interference filter can be cited.

Figure 20:
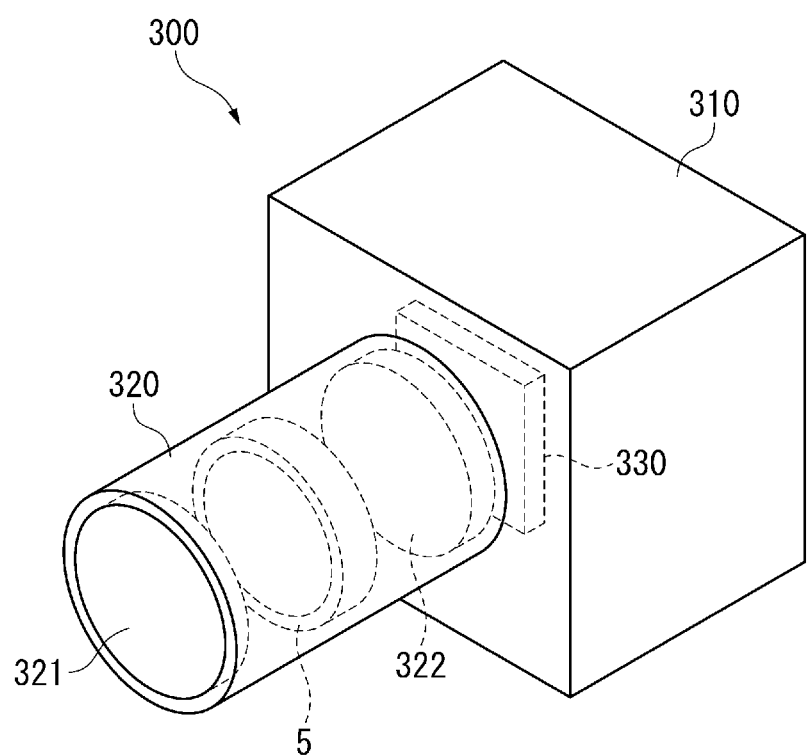
FIG. 20 is a diagram showing a schematic configuration of a spectroscopic camera as an example of the electronic apparatus according to the invention.

FIG. 20 is a schematic diagram showing a schematic configuration of the spectroscopic camera. As shown in FIG. 20, a spectroscopic camera 300 is provided with a camera main body 310, an image pickup lens unit 320, and an image pickup section 330 (a detection section).

The camera main boy 310 is a part which is gripped and operated by the user.

The image pickup lens unit 320 is provided to the camera main body 310, and guides the image light input thereto to the image pickup section 330. Further, as shown in FIG. 20, the image pickup lens unit 320 is configured including an objective lens 321, an imaging lens 322, and the variable wavelength interference filter 5 disposed between these lenses. It should be noted that it is also possible to use the variable wavelength interference filter having the electrode configuration shown in the second embodiment or FIGS. 12 through 15 instead of the variable wavelength interference filter 5, or it is possible to provide the optical filter device 600 according to the third embodiment.

The image pickup section 330 is formed of a light receiving element, and takes the image of the image light guided by the image pickup lens unit 320.

In such a spectroscopic camera 300, by transmitting the light with the wavelength to be the imaging object using the variable wavelength interference filter 5, the spectral image of the light with a desired wavelength can be taken. As such, since the voltage control section (not shown) drives the variable wavelength interference filter 5 using the drive method according to the embodiment of the invention described in the first embodiment described above with respect to each of the wavelengths, it is possible to accurately take out the image light of the spectral image of the target wavelength.

Further, the variable wavelength interference filter according to the embodiment of the invention can be used as a band-pass filter, and can also be used as, for example, an optical laser device for dispersing and transmitting only the light with a narrow band centered on a predetermined wavelength out of the light in a predetermined wavelength band emitted by the light emitting element using the variable wavelength interference filter.

Further, the variable wavelength interference filter according to the embodiment of the invention can be used as a biometric authentication device, and can be applied to, for example, an authentication device of blood vessels, a fingerprint, a retina, an iris, and so on using the light in a near infrared range or a visible range.

Further, the optical module and the electronic apparatus can be used as a concentration detection device. In this case, the infrared energy (the infrared light) emitted from the substance is dispersed by the variable wavelength interference filter and is then analyzed, and the concentration of the test object in a sample is measured.

As described above, the variable wavelength interference filter, the optical module, and the electronic apparatus according to the embodiment of the invention can be applied to any device for dispersing predetermined light from the incident light. Further, since the variable wavelength interference filter according to the embodiment of the invention can disperse the light into a plurality of wavelength components with a single device as described above, the measurement of the spectrum of a plurality of wavelengths and detection of a plurality of components can be performed with accuracy. Therefore, compared to the existing device of taking out desired wavelengths with a plurality of devices, downsizing of the optical module and the electronic apparatus can be promoted, and the optical module and the electronic apparatus can preferably be used as, for example, a portable or an in-car optical device.

Besides the above, specific structures to be adopted when putting the invention into practice can arbitrarily be replaced with other structures and so on within the range in which the advantages of the invention can be achieved.

The entire disclosure of Japanese Patent Application No. 2012-089970 filed Apr. 11, 2012 is expressly incorporated herein by reference.

What is claimed is:

1. A variable wavelength interference filter comprising:
a first substrate;
a second substrate opposed to the first substrate;
a first reflecting film provided to the first substrate;
a second reflecting film provided to the second substrate, and opposed to the first reflecting film across a gap;
a first driving electrode provided to the first substrate;
a second driving electrode provided to the second substrate, and opposed to the first driving electrode;
a first extraction electrode electrically connected to the first driving electrode; and
a second extraction electrode electrically connected to the second driving electrode,
wherein the first driving electrode and the second driving electrode are disposed outside an optical interference region where the first reflecting film and the second reflecting film overlap each other in a plan view of the first substrate and the second substrate,
the first driving electrode has a first peripheral edge located so as to face the optical interference region, the first peripheral edge being located nearer to the optical interference region than peripheral edges of the second driving electrode in the plan view,
the first driving electrode has a second peripheral edge located on an opposite side of the first driving electrode relative to the first peripheral edge, the second peripheral edge being located further from the optical interference region than the peripheral edges of the second driving electrode in the plan view,
the second extraction electrode does not overlap with the first driving electrode in the plan view,
the gap between the first reflecting film and the second reflecting film is configured to be changed by applying a voltage between the first driving electrode and the second driving electrode,
the first driving electrode has a first partial electrode and a second partial electrode in the plan view, and has a first connection electrode that connects the first partial electrode and the second partial electrode, the second driving electrode being located between the first connection electrode and the second reflecting film in the plan view along a direction from the reflection film to the connection electrode, and the first connection electrode being connected to the first extraction electrode,
the first extraction electrode is disposed at a position not overlapping the second driving electrode and the second extraction electrode in the plan view, and
the second extraction electrode is connected to the second driving electrode at a position overlapping an area between two adjacent first partial electrodes in the plan view.

2. The variable wavelength interference filter according to claim 1, wherein the first substrate includes a first reflection film installing section and an electrode-installation groove surrounding the first reflection film installing section, the first reflection film installing section protruding away from the electrode-installation groove;
the first reflecting film is provided to the first reflection film installing section of the first substrate;
the first driving electrode is provided to the electrode-installation groove of the first substrate; and
the first peripheral edge is located nearer to the optical interference region than peripheral edges of the second driving electrode in the plan view such that the first peripheral edge abuts the first reflection film installing section.

3. The variable wavelength interference filter according to claim 1, wherein the first driving electrode has a first edge crossing to the first peripheral edge and the second peripheral edge, and a second edge opposing to the first peripheral edge and the second peripheral edge,
the second extraction electrode extends from a portion between the first edge and the second edge.

4. The variable wavelength interference filter according to claim 3, wherein the first extraction electrode does not overlap with the second driving electrode.

5. An optical filter device comprising:
a variable wavelength interference filter including
a first substrate,
a second substrate opposed to the first substrate,
a first reflecting film provided to the first substrate,
a second reflecting film provided to the second substrate, and opposed to the first reflecting film across a gap,
a first driving electrode provided to the first substrate,
a second driving electrode provided to the second substrate, and opposed to the first driving electrode,
a first extraction electrode electrically connected to the first driving electrode, and
a second extraction electrode electrically connected to the second driving electrode; and
a housing supporting the variable wavelength interference filter, wherein the first driving electrode and the second driving electrode are disposed outside an optical interference region where the first reflecting film and the second reflecting film overlap each other in a plan view of the first substrate and the second substrate, the first driving electrode has a first peripheral edge located so as to face the optical interference region, the first peripheral edge being located nearer to the optical interference region than peripheral edges of the second driving electrode in the plan view, the first driving electrode has a second peripheral edge located on an opposite side of the first driving electrode relative to the first peripheral edge, the second peripheral edge being located further from the optical interference region than the peripheral edges of the second driving electrode in the plan view, the second extraction electrode does not overlap with the first driving electrode in the plan view, the gap between the first reflecting film and the second reflecting film is configured to be changed by applying a voltage between the first driving electrode and the second driving electrode, the first driving electrode has a first partial electrode and a second partial electrode in the plan view, and has a first connection electrode that connects the first partial electrode and the second partial electrode, the second driving electrode being located between the first connection electrode and the second reflecting film in the plan view along a direction from the reflection film to the connection electrode, and the first connection electrode being connected to the first extraction electrode, the first extraction electrode is disposed at a position not overlapping the second driving electrode and the second extraction electrode in the plan view, and the second extraction electrode is connected to the second driving electrode at a position overlapping an area between two adjacent first partial electrodes in the plan view.

6. The optical filter device according to claim 5, wherein the first substrate includes a first reflection film installing section and an electrode-installation groove surrounding the first reflection film installing section, the first reflection film installing section protruding away from the electrode-installation groove;

the first reflecting film is provided to the first reflection film installing section of the first substrate;

the first driving electrode is provided to the electrode-installation groove of the first substrate; and the first peripheral edge is located nearer to the optical interference region than peripheral edges of the second driving electrode in the plan view such that the first peripheral edge abuts the first reflection film installing section.

7. An optical module comprising:
a first substrate;
a second substrate opposed to the first substrate;
a first reflecting film provided to the first substrate;
a second reflecting film provided to the second substrate, and opposed to the first reflecting film across a gap;
a first driving electrode provided to the first substrate;
a second driving electrode provided to the second substrate, and opposed to the first driving electrode;
a first extraction electrode electrically connected to the first driving electrode;
a second extraction electrode electrically connected to the second driving electrode; and a detection section detecting light transmitted by the first reflecting film and the second reflecting film, wherein the first driving electrode and the second driving electrode are disposed outside an optical interference region where the first reflecting film and the second reflecting film overlap each other in a plan view of the first substrate and the second substrate, the first driving electrode has a first peripheral edge located so as to face the optical interference region the first peripheral edge being located nearer to the optical interference region than peripheral edges of the second driving electrode in the plan view, the first driving electrode has a second peripheral edge located on an opposite side of the first driving electrode relative to the first peripheral edge, the second peripheral edge being located further from the optical interference region than the peripheral edges of the second driving electrode in the plan view, the second extraction electrode does not overlap with the first driving electrode in the plan view, the gap between the first reflecting film and the second reflecting film is configured to be changed by applying a voltage between the first driving electrode and the second driving electrode, the first driving electrode has a first partial electrode and a second partial electrode in the plan view, and has a first connection electrode that connects the first partial electrode and the second partial electrode, the second driving electrode being located between the first connection electrode and the second reflecting film in the plan view along a direction from the reflection film to the connection electrode, and the first connection electrode being connected to the first extraction electrode, the first extraction electrode is disposed at a position not overlapping the second driving electrode and the second extraction electrode in the plan view, and the second extraction electrode is connected to the second driving electrode at a position overlapping an area between two adjacent first partial electrodes in the plan view.

8. The optical module according to claim 7, wherein the first substrate includes a first reflection film installing section and an electrode-installation groove surrounding the first reflection film installing section, the first reflection film installing section protruding away from the electrode-installation groove;

the first reflecting film provided to the first reflection film installing section of the first substrate;

the first driving electrode is provided to the electrode-installation groove of the first substrate; and the first driving electrode having the first peripheral edge is located so as to face the optical interference region the first peripheral edge being located nearer to the optical interference region than peripheral edges of the second driving electrode in the plan view such that the first peripheral edge abuts the first reflection film installing section.

9. An electronic apparatus comprising:
a variable wavelength interference filter including:
a first substrate,
a second substrate opposed to the first substrate,
a first reflecting film provided to the first substrate,
a second reflecting film provided to the second substrate, and opposed to the first reflecting film across a gap,
a first driving electrode provided to the first substrate, a second driving electrode provided to the second substrate, and opposed to the first driving electrode,
a first extraction electrode electrically connected to the first driving electrode, and
a second extraction electrode electrically connected to the second driving electrode; and
a control section controlling the variable wavelength interference filter,
wherein the first driving electrode and the second driving electrode are disposed outside an optical interference region where the first reflecting film and the second reflecting film overlap each other in a plan view of the first substrate and the second substrate,
the first driving electrode has a first peripheral edge located so as to face the optical interference region, the first peripheral edge being located nearer to the optical interference region than peripheral edges of the second driving electrode in the plan view,
the first driving electrode has a second peripheral edge located on an opposite side of the first driving electrode relative to the first peripheral edge, the second peripheral edge being located further from the optical interference region than the peripheral edges of the second driving electrode in the plan view,
the second extraction electrode does not overlap with the first driving electrode in the plan view,
the gap between the first reflecting film and the second reflecting film is configured to be changed by applying a voltage between the first driving electrode and the second driving electrode,
the first driving electrode has a first partial electrode and a second partial electrode in the plan view, and has a first connection electrode that connects the first partial electrode and the second partial electrode, the second driving electrode being located between the first connection electrode and the second reflecting film in the plan view along a direction from the reflection film to the connection electrode, and the first connection electrode being connected to the first extraction electrode,
the first extraction electrode is disposed at a position not overlapping the second driving electrode and the second extraction electrode in the plan view, and
the second extraction electrode is connected to the second driving electrode at a position overlapping an area between two adjacent first partial electrodes in the plan view.

10. The electronic apparatus according to claim 9, wherein the first substrate includes a first reflection film installing section and an electrode-installation groove surrounding the first reflection film installing section, the first reflection film installing section protruding away from the electrode-installation groove;
the first reflecting film is provided to the first reflection film installing section of the first substrate;
the first driving electrode is provided to the electrode-installation groove of the first substrate, and
the first peripheral edge is located nearer to the optical interference region than peripheral edges of the second driving electrode in the plan view such that the first peripheral edge abuts the first reflection film installing section.

11. A variable wavelength interference filter comprising:
a first substrate;
a second substrate opposed to the first substrate;
a first reflecting film provided to the first substrate;
a second reflecting film provided to the second substrate, and opposed to the first reflecting film across a gap;
a first driving electrode provided to the first substrate, and having a first width in a plan view of the first substrate and the second substrate;
a second driving electrode provided to the second substrate, opposed to the first driving electrode, and having a second width in the plan view;
a first extraction electrode electrically connected to the first driving electrode; and
a second extraction electrode electrically connected to the second driving electrode,
wherein the first width is larger than the second width,
the second extraction electrode does not overlap with the first driving electrode in the plan view,
the gap between the first reflecting film and the second reflecting film is configured to be changed by applying a voltage between the first driving electrode and the second driving electrode,
the first driving electrode has a first partial electrode and a second partial electrode in the plan view, and has a first connection electrode that connects the first partial electrode and the second partial electrode, the second driving electrode being located between the first connection electrode and the second reflecting film in the plan view along a direction from the reflection film to the connection electrode, and the first connection electrode being connected to the first extraction electrode,
the first extraction electrode is disposed at a position not overlapping the second driving electrode and the second extraction electrode in the plan view, and
the second extraction electrode is connected to the second driving electrode at a position overlapping an area between two adjacent first partial electrodes in the plan view.

12. The variable wavelength interference filter according to claim 11, wherein the first substrate includes a first reflection film installing section and an electrode-installation groove surrounding the first reflection film installing section, the first reflection film installing section protruding away from the electrode-installation groove;
the first reflecting film is provided to the first reflection film installing section of the first substrate;
the first driving electrode is provided to the electrode-installation groove of the first substrate, and having a first width in a plan view of the first substrate and the second substrate; and
the first width is larger than the second width such that an inner peripheral edge of the first driving electrode abuts the first reflection film installing section and an inner peripheral edge of the second driving electrode is spaced apart from the first reflection film installing section in the plan view.

13. A variable wavelength interference filter comprising:
a first substrate;
a second substrate opposed to the first substrate;
a first reflecting film provided to the first substrate;
a second reflecting film provided to the second substrate, and opposed to the first reflecting film across a gap;
a first driving electrode provided to the first substrate, and having a first width in a plan view of the first substrate and the second substrate; and
a second driving electrode provided to the second substrate, opposed to the first driving electrode, and having a second width in the plan view;
a first extraction electrode electrically connected to the first driving electrode; and
a second extraction electrode electrically connected to the second driving electrode, wherein the second driving electrode is formed within a footprint of the first driving electrode in the plan view, the second extraction electrode does not overlap with the first driving electrode in the plan view, the gap between the first reflecting film and the second reflecting film is configured to be changed by applying a voltage between the first driving electrode and the second driving electrode, the first driving electrode has a first partial electrode and a second partial electrode in the plan view, and has a first connection electrode that connects the first partial electrode and the second partial electrode, the second driving electrode being located between the first connection electrode and the second reflecting film in the plan view along a direction from the reflection film to the connection electrode, and the first connection electrode being connected to the first extraction electrode, the first extraction electrode is disposed at a position not overlapping the second driving electrode and the second extraction electrode in the plan view, and the second extraction electrode is connected to the second driving electrode at a position overlapping an area between two adjacent first partial electrodes in the plan view.

14. The variable wavelength interference filter according to claim 13, wherein the first substrate includes a first reflection film installing section and an electrode-installation groove surrounding the first reflection film installing section, the first reflection film installing section protruding away from the electrode-installation groove;

the first reflecting film is provided to the first reflection film installing section of the first substrate;

the first driving electrode provided to the electrode-installation groove of the first substrate, and having a first width in a plan view of the first substrate and the second substrate; and the second driving electrode is formed within a footprint of the first driving electrode such that an inner peripheral edge of the first driving electrode abuts the first reflection film installing section and an inner peripheral edge of the second driving electrode is spaced apart from the first reflection film installing section in the plan view.

15. A variable interference filter comprising:
a first substrate;
a second substrate that is opposed to the first substrate;
a first reflector that is disposed between the first substrate and the second substrate;
a second reflector that is disposed between the first reflector and the second substrate;
a first driving electrode that is disposed between the first substrate and the second substrate;
a second driving electrode that is disposed between the first driving electrode and the second substrate, the second driving electrode being opposed to the first driving electrode;
a first extraction electrode that is electrically connected to the first driving electrode; and
a second extraction electrode that is electrically connected to the second driving electrode, wherein the first driving electrode includes a first partial electrode, a second partial electrode, and a first connection electrode that connects the first partial electrode and the second connection electrode, and wherein, when looking from a direction from a first substrate side to a second substrate side:
the first partial electrode has a first edge and a second edge, the first edge being located between the second edge and the first reflector,
the second driving electrode has a third edge and a fourth edge, the third edge being located between the fourth edge and the second reflector, and the third edge and the fourth edge being located between the first edge and the second edge, and
the second driving electrode is located between the first connection electrode and the second reflector along a direction from the second reflector to the first connection electrode, the first extraction electrode being connected to the first connection electrode.

16. The variable interference filter according to claim 15, wherein, when looking from the direction from the first substrate side to the second substrate side, the second extraction electrode is connected to the second driving electrode at a location between the first partial electrode and the second partial electrode.

17. A variable interference filter comprising:
a first substrate;
a second substrate that is opposed to the first substrate;
a first reflector that is disposed between the first substrate and the second substrate;
a second reflector that is disposed between the first reflector and the second substrate;
a first driving electrode that is disposed between the first substrate and the second substrate;
a second driving electrode that is disposed between the first driving electrode and the second substrate, the second driving electrode being opposed to the first driving electrode;
a first extraction electrode that is electrically connected to the first driving electrode; and
a second extraction electrode that is electrically connected to the second driving electrode, wherein the first electrode includes a first partial electrode, a second partial electrode, and a first connection electrode that connects the first partial electrode and the second connection electrode, and wherein, when looking from a direction from a first substrate side to a second substrate side, the second driving electrode is located between the first connection electrode and the second reflector along a direction from the second reflector to the first connection electrode, and the first extraction electrode is connected to the first connection electrode.

* * * * *